(12) United States Patent
Kawabe et al.

(10) Patent No.: US 10,910,013 B1
(45) Date of Patent: Feb. 2, 2021

(54) MAGNETIC DISK DEVICE AND WRITE PROCESSING METHOD

(71) Applicants: Kabushiki Kaisha Toshiba, Tokyo (JP); Toshiba Electronic Devices & Storage Corporation, Tokyo (JP)

(72) Inventors: Takayuki Kawabe, Sagamihara Kanagawa (JP); Takeyori Hara, Kawasaki Kanagawa (JP); Nobuhiro Maeto, Yokohama (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/804,537

(22) Filed: Feb. 28, 2020

(30) Foreign Application Priority Data

Sep. 18, 2019 (JP) .................. 2019-169201

(51) Int. Cl.
*G11B 21/18* (2006.01)
*G11B 20/18* (2006.01)
*G11B 20/12* (2006.01)
*G11B 5/58* (2006.01)

(52) U.S. Cl.
CPC ...... *G11B 20/1876* (2013.01); *G11B 20/1217* (2013.01); *G11B 20/1816* (2013.01); *G11B 5/58* (2013.01); *G11B 2020/1222* (2013.01); *G11B 2020/183* (2013.01)

(58) Field of Classification Search
None
See application file for complete search history.

(56) References Cited

U.S. PATENT DOCUMENTS

| | | | | |
|---|---|---|---|---|
| 6,111,714 A | * | 8/2000 | Ueda | G11B 21/106 360/60 |
| 6,657,805 B2 | * | 12/2003 | Nishida | G11B 5/596 360/53 |
| 7,245,447 B2 | | 7/2007 | Zaitsu | |
| 8,587,889 B2 | | 11/2013 | Kawabe | |
| 8,885,284 B2 | * | 11/2014 | Kashiwagi | G11B 5/56 360/75 |
| 8,896,959 B1 | * | 11/2014 | Kashiwagi | G11B 5/5582 360/75 |
| 9,064,526 B1 | * | 6/2015 | Kawabe | G11B 19/048 |
| 9,236,073 B1 | | 1/2016 | Liu et al. | |

(Continued)

FOREIGN PATENT DOCUMENTS

| | | |
|---|---|---|
| JP | 2012-252732 A | 12/2012 |
| JP | 2014-89780 A | 5/2014 |
| JP | 2019-215943 A | 12/2019 |

*Primary Examiner* — Tan X Dinh
(74) *Attorney, Agent, or Firm* — White & Case LLP

(57) ABSTRACT

According to one embodiment, a magnetic disk device includes a disk including a first track including a first sector, a second sector, and a first parity sector, a head, and a controller configured to, when writing a second track adjacent to the first track in the first direction, even if, in a third sector of the second track adjacent to the first sector in the first direction, a first upper limit in a second direction opposite to the first direction, continue the processing of writing data to the third sector, and if, in a fourth sector adjacent to the second sector in the first direction, a second upper limit in the second direction, stop the processing of writing data to the fourth sector.

20 Claims, 18 Drawing Sheets

(56) References Cited

U.S. PATENT DOCUMENTS

| | | | |
|---|---|---|---|
| 9,240,198 B1* | 1/2016 | Hara | G11B 5/59627 |
| 10,437,674 B1* | 10/2019 | Sridhara | G06F 11/1076 |
| 10,650,860 B2* | 5/2020 | Maeto | G11B 5/012 |
| 10,658,004 B2* | 5/2020 | Kawabe | G11B 5/012 |
| 2012/0307400 A1* | 12/2012 | Kawabe | G11B 5/012 |
| | | | 360/77.01 |
| 2014/0118857 A1 | 5/2014 | Kashiwagi et al. | |
| 2017/0178672 A1* | 6/2017 | Zhu | G11B 5/012 |
| 2017/0186455 A1* | 6/2017 | Hara | G11B 5/012 |
| 2017/0200470 A1* | 7/2017 | Kojima | G11B 5/5547 |
| 2019/0378543 A1 | 12/2019 | Maeto et al. | |

\* cited by examiner

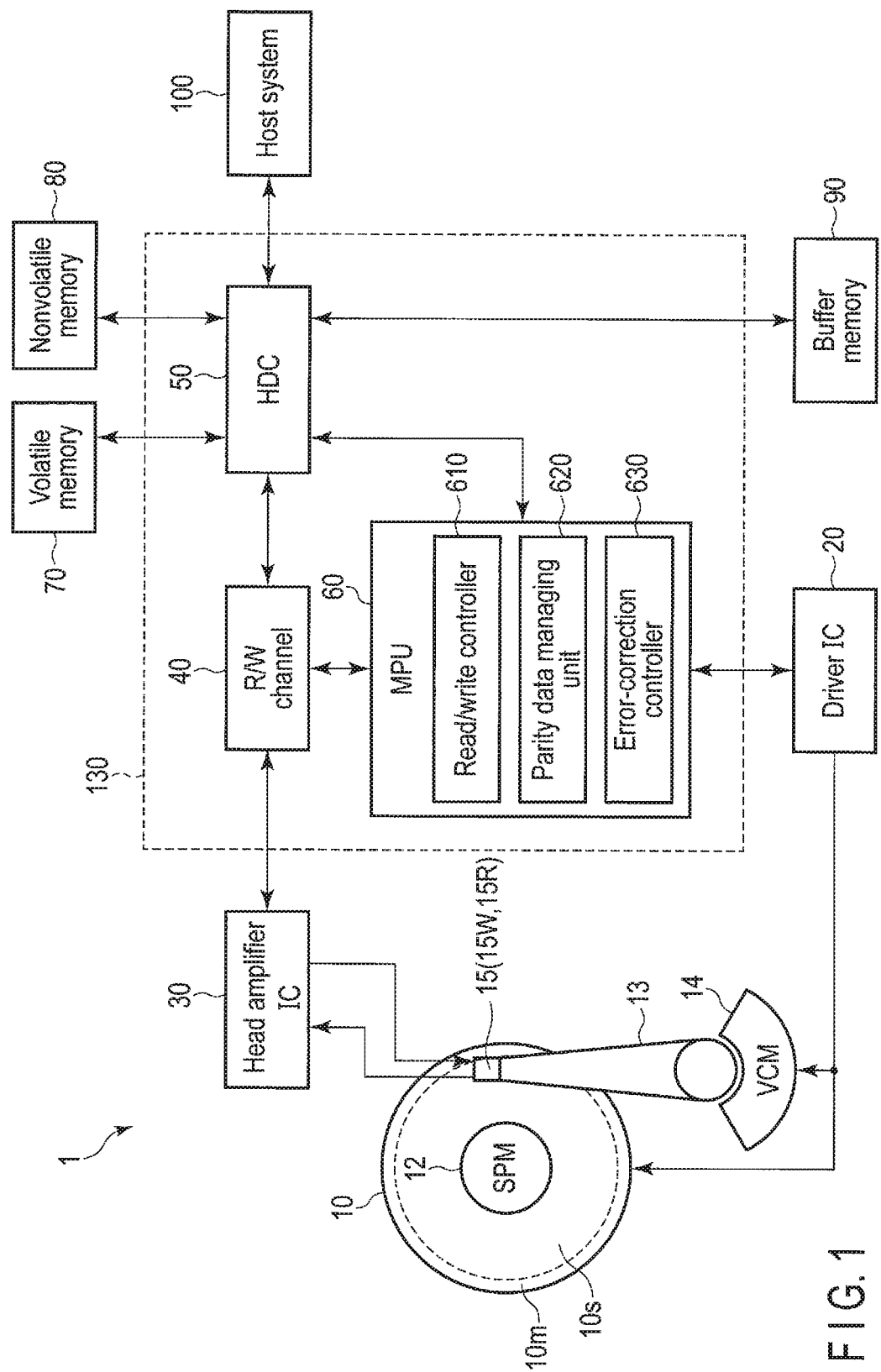
F I G. 1

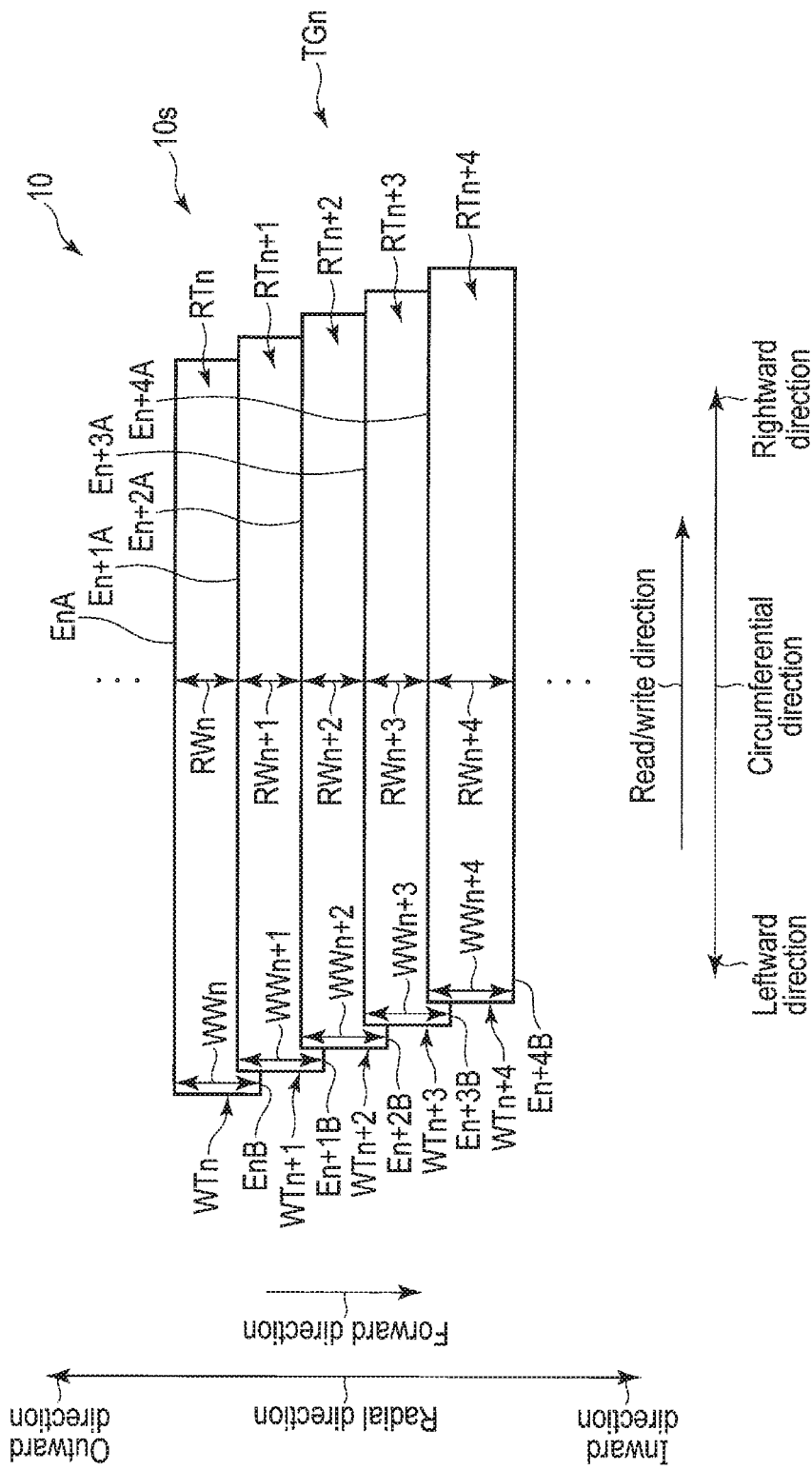
F I G. 3

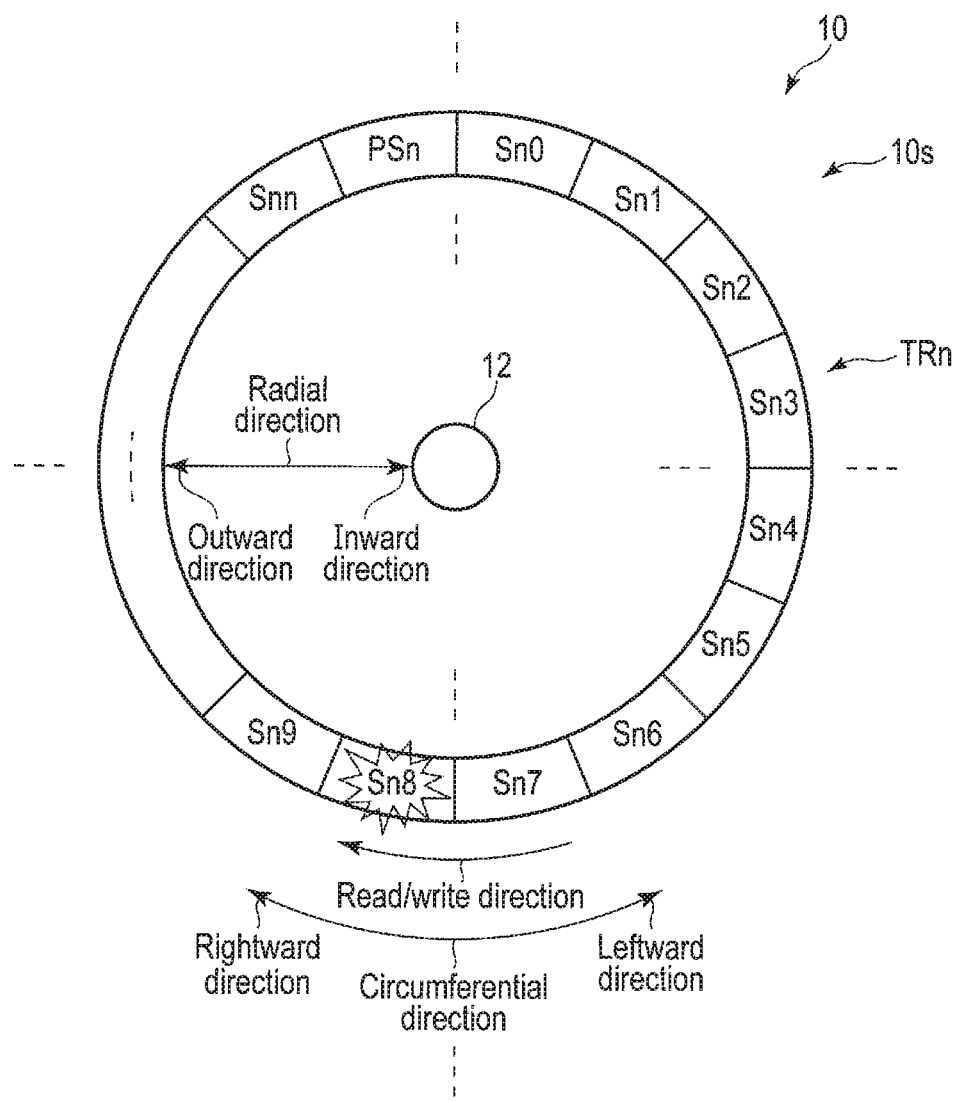
F I G. 5

| Sector number | Sc00 | Sc01 | Sc02 | Sc03 | Sc04 | Sc05 | Sc06 | Sc07 | Sc08 | Sc09 |
|---|---|---|---|---|---|---|---|---|---|---|
| Priority number | 6 | 4 | 2 | 7 | 9 | 8 | 5 | 1 | 0 | 3 |

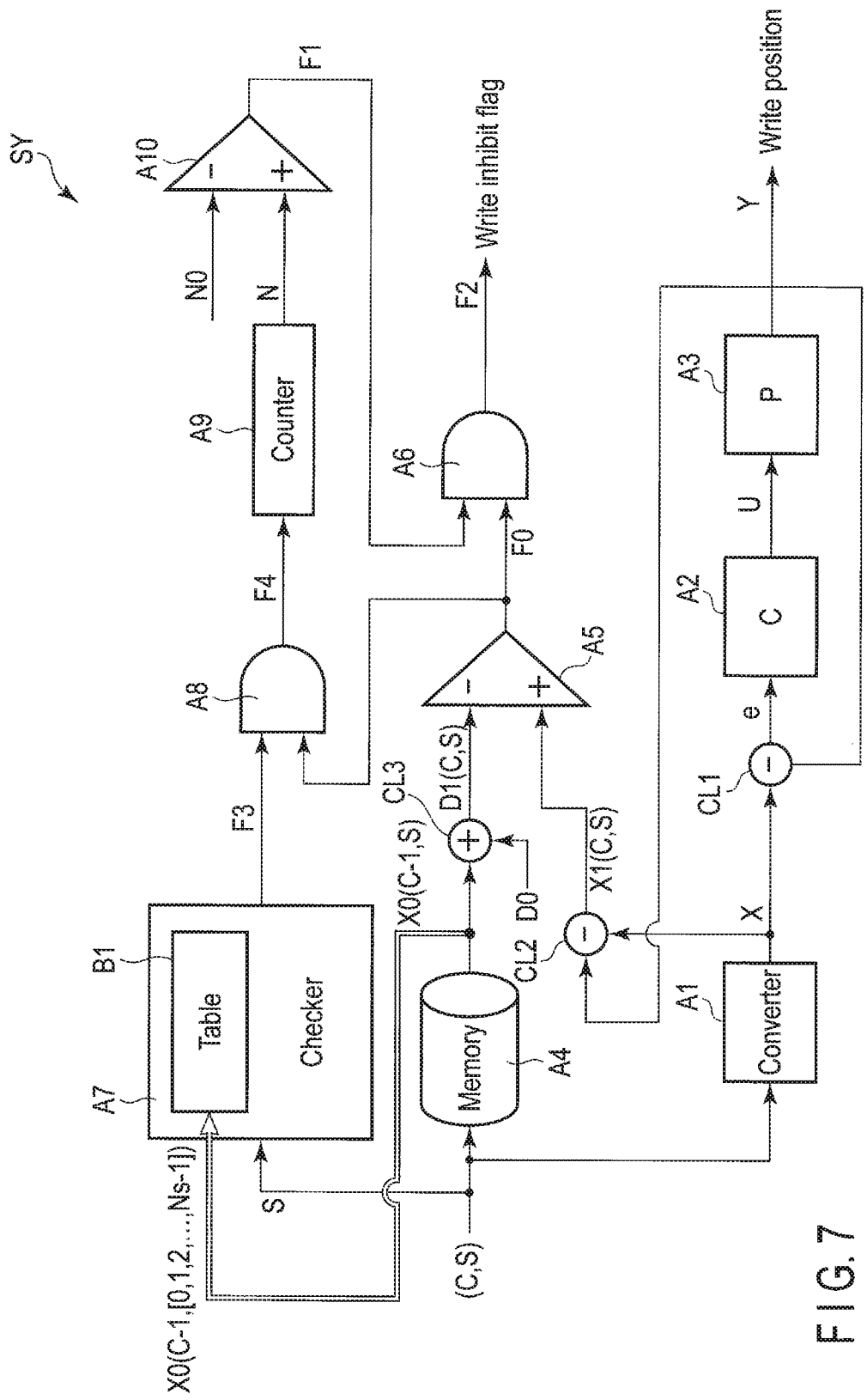
F I G. 7

| Sector number | Sc00 | Sc01 | Sc02 | Sc03 | Sc04 | Sc05 | Sc06 | Sc07 | Sc08 | Sc09 |
|---|---|---|---|---|---|---|---|---|---|---|
| DDOL priority number | 6 | 4 | 2 | 7 | 9 | 8 | 5 | 1 | 0 | 3 |
| SEEK priority number | 3 | 2 | 4 | 7 | 9 | 8 | 6 | 1 | 0 | 5 |

| Sector number | | Sc00 | Sc01 | Sc02 | Sc03 | Sc04 | Sc05 | Sc06 | Sc07 | Sc08 | Sc09 |
|---|---|---|---|---|---|---|---|---|---|---|---|
| Already written | Number of to-be-corrected sectors | | | | | | | | | | |
| 0 | 5 | 6 | 4 | 2 | 7 | 9 | 8 | 5 | 1 | 0 | 3 |
| Sc10 | 5 | ◎ | 4 | 2 | 6 | 8 | 7 | 5 | 1 | 0 | 3 |
| Sc11 | 5 | | ◎ | 2 | 5 | 7 | 6 | 4 | 1 | 0 | 3 |
| Sc12 | 4 | | | ○ | 4 | 6 | 5 | 3 | 1 | 0 | 2 |
| Sc13 | 4 | | | | X | 5 | 4 | 3 | 1 | 0 | 2 |
| Sc14 | 4 | | | | | ◎ | 4 | 3 | 1 | 0 | 2 |
| Sc15 | 4 | | | | | | ◎ | 3 | 1 | 0 | 2 |
| Sc16 | 4 | | | | | | | ◎ | 1 | 0 | 2 |
| Sc17 | 4 | | | | | | | | ◎ | 0 | 2 |
| Sc18 | 3 | | | | | | | | | ○ | 1 |
| Sc19 | 2 | | | | | | | | | | ○ |

TB3

F I G. 14B

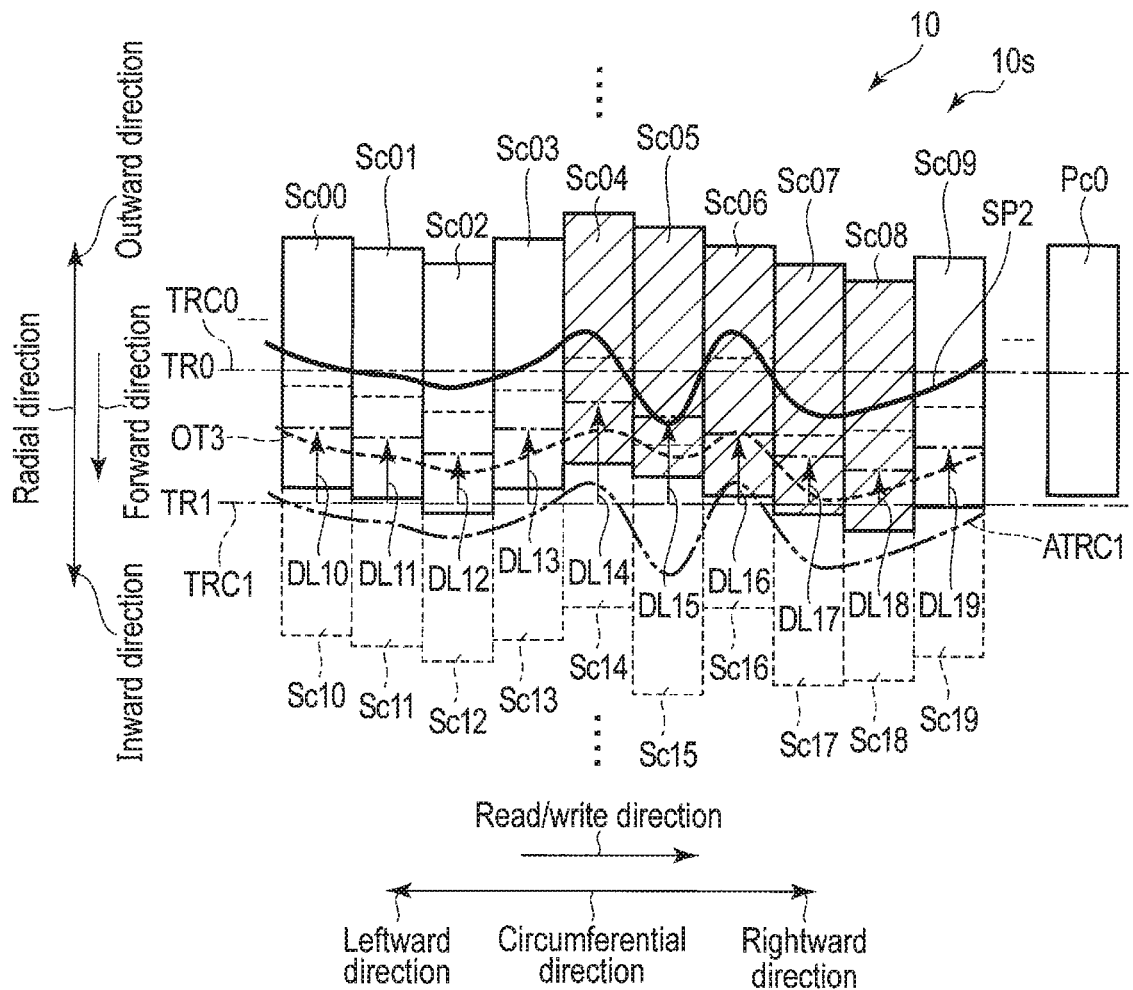
F I G. 16A
| Sector number | Sc04 | Sc05 | Sc06 | Sc07 |
|---|---|---|---|---|
| Priority number | 2 | 0 | 3 | 1 |
F I G. 16B

MAGNETIC DISK DEVICE AND WRITE PROCESSING METHOD

CROSS-REFERENCE TO RELATED APPLICATIONS

This application is based upon and claims the benefit of priority from Japanese Patent Application No. 2019-169201, filed Sep. 18, 2019, the entire contents of which are incorporated herein by reference.

FIELD

Embodiments described herein relate generally to a magnetic disk device and write processing method.

BACKGROUND

A magnetic disk device generates parity data corresponding to data of one round of a particular track of a disk and writes the parity data to a particular area of the disk. When it is not possible to read data written to a particular sector of the particular track, the magnetic disk device executes an error correction on the unreadable data of the sector on the basis of the parity data. In the particular track, the number of sectors which can be error-corrected on the basis of the parity data is limited.

BRIEF DESCRIPTION OF THE DRAWINGS

FIG. 1 is a block diagram showing the configuration of a magnetic disk device according to a first embodiment.

FIG. 3 is a schematic view showing an example of a shingled magnetic recording area to which data is written.

FIG. 5 is a schematic view showing an example of an error-correcting method for each track according to the first embodiment.

FIG. 7 is a block diagram showing an example of a positioning control system of the head at the time of write processing according to the first embodiment.

FIG. 14B is a schematic view showing an example of a table of priority numbers set to sectors of a particular track according to the modification example 2.

FIG. 16A is a schematic view showing an example of a method of setting a correction-object sector according to a modification example 3.

FIG. 16B is a schematic view showing an example of a table of priority numbers set to several sectors of a particular track according to the modification example 3.

DETAILED DESCRIPTION

Figure 2:
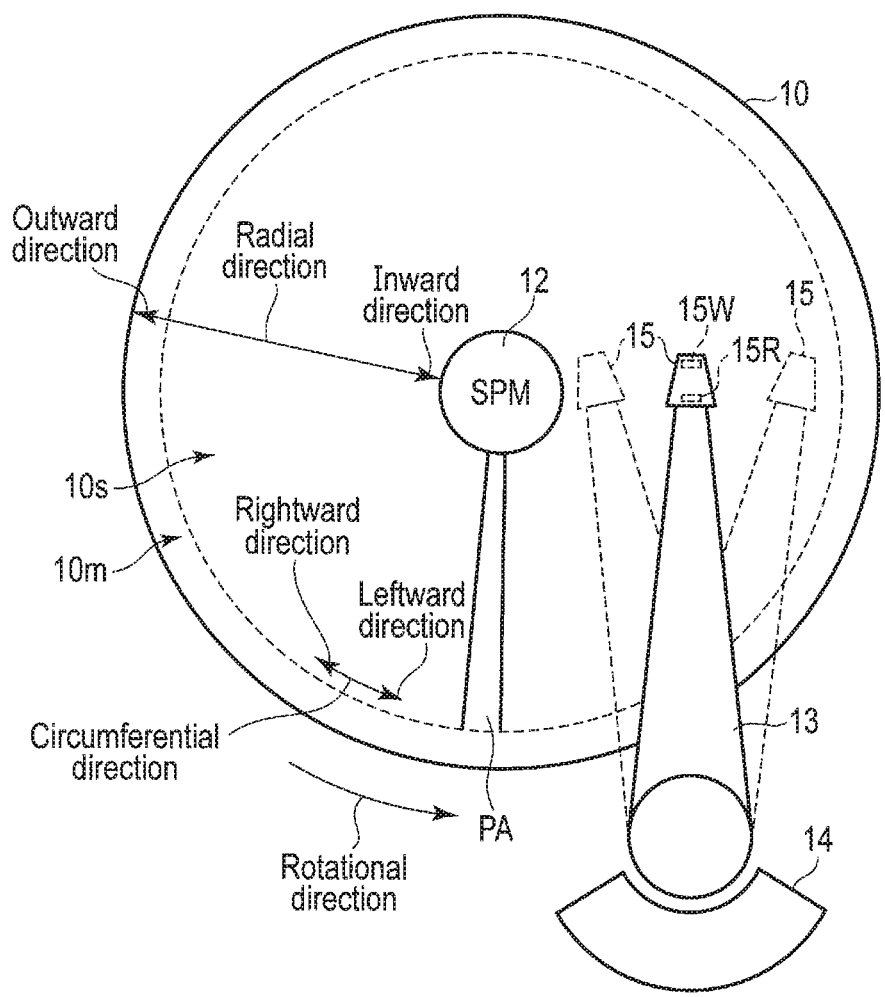
FIG. 2 is a schematic view showing an example of an arrangement of a head relative to a disk according to the first embodiment.

In general, according to one embodiment, a magnetic disk device comprising: a disk comprising a first track including a first sector positioned in a first direction of the radial direction with a first positioning error, a second sector positioned in the first direction with a second positioning error less than the first positioning error, and a first parity sector; a head configured to write data to the disk and read data from the disk; and a controller configured to, when writing a second track adjacent to the first track in the first direction, even if, in a third sector of the second track adjacent to the first sector in the first direction, a first upper limit of an error in positioning in a second direction opposite to the first direction to be determined according to the first positioning error of the first sector is exceeded, continue the processing of writing data to the third sector, and if, in a fourth sector of the second track adjacent to the second sector in the first direction, a second upper limit of an error in positioning in the second direction to be determined according to the second positioning error of the second sector is exceeded, stop the processing of writing data to the fourth sector.

Hereinafter, an embodiment will be described below with reference to the accompanying drawings. It should be noted that the drawings have been presented by way of example only, and are not intended to limit the scope of the invention.

First Embodiment

FIG. 1 is a block diagram showing the configuration of a magnetic disk device 1 according to a first embodiment.

The magnetic disk device 1 is provided with a head disk assembly (HDA) to be described later, driver IC 20, head amplifier integrated circuit (hereinafter referred to as a head amplifier IC or preamplifier in some cases) 30, volatile memory 70, nonvolatile memory 80, buffer memory (buffer) 90, and system controller 130 which is a one-chip integrated circuit. Further, the magnetic disk device 1 is connected to a host system (host) 100.

The HDA includes a magnetic disk (hereinafter referred to as a disk) 10, spindle motor (SPM) 12, arm 13 on which a head 15 is mounted, and voice coil motor (VCM) 14. The disk 10 is fixed to the spindle motor 12 and rotated by driving of the spindle motor 12. The arm 13 and VCM 14 constitute an actuator. The actuator controls movement of the head 15 mounted on the arm 13 to a particular position of the disk 10. Two or more disks 10 and heads 15 may be provided. Hereinafter, data to be written to each section of the magnetic disk device 1 and to an external device, for example, the disk 10 is called write data in some cases, and data read from each section of the magnetic disk device 1 and from an external device, for example, disk 10 is called read data in some cases. Write data is simply called data in some cases, read data is simply called data in some cases, and write data and read data are collectively called data in some cases.

In the disk 10, a shingled magnetic recording (SMR) area 10s and media cache area 10m are assigned to the recording area thereof. Hereinafter, a direction along the circumference of the disk 10 is called a circumferential direction, and direction perpendicular to the circumferential direction is called a radial direction. A particular position in a particular circumferential direction of the disk 10 is called a circumferential position, and particular position in a particular radial direction of the disk 10 is called a radial position. Further, the radial position and circumferential position are collectively and simply called positions in some cases.

In the shingled magnetic recording area 10s, user data or the like write-requested by the host 100 is recorded. The media cache area 10m can be utilized as a cache of the shingled magnetic recording area 10s. In the shingled magnetic recording area 10s, part of a track is overwritten with a track to be subsequently written. Accordingly, the track density (track per inch: TPI) of the shingled magnetic recording area 10s becomes higher than that of a recording area in which overwriting is not carried out. In the shingled magnetic recording area 10s, a plurality of track groups each of which includes a plurality of tracks unilaterally and consecutively overwritten in the radial direction are arranged with gaps held between the groups. Hereinafter, the track groups each of which includes the plurality of tracks unilaterally and consecutively overwritten in the radial direction are called a band area. The band area includes at least one track part of which is overwritten with a track (hereinafter referred to as an adjacent track in some cases) adjacent in the radial direction and track (hereinafter referred to as a final track in some cases) finally overwriting on the immediately preceding track. Here, the term "adjacent (adjacency)" naturally includes a state where data items, substances, areas or vacuities are arranged in contact with each other, and also includes a state where data items, substances, areas or vacuities are arranged at particular intervals. No part of the final track is overwritten with another track, and hence the final track is greater in the width (hereinafter referred to as a track width in some cases) in the radial direction than a track part of which is overwritten with another track. It should be noted that in the shingled magnetic recording area 10s, data may be written in an conventional magnetic recording scheme other than the shingled magnetic recording scheme. The media cache area 10m may also be utilized as an area or the like to which information necessary for system management is to be written. Further, in each of the shingled magnetic recording scheme and conventional magnetic recording scheme, the media cache area 10m may not be provided. Hereinafter, the term "track" is used in various senses such as "one area of a plurality of areas divided in the radial direction of the disk 10", "data corresponding to one round of the disk 10 written in the circumferential direction of the disk 10", "route making a round in the circumferential direction of the disk 10", and the like. A track includes a plurality of sectors. The term "sector" is used in various senses such as "one area of a plurality of areas formed by dividing a track in the circumferential direction", "data written to one area of a plurality of areas formed by dividing a track in the circumferential direction", and the like. A sector adjacent to a particular sector in the radial direction is called an "adjacent sector" in some cases. A width of a track in the radial direction is called a track width. A center position of a track width at a particular circumferential position of a particular track is called a track center in some cases, and route passing through a center of a track width of a particular track is called a track center in some cases. Further, a "written track" is called a "write track". A remaining area of a write track except an area overwritten with an adjacent track is called a "read track" in some cases. Further, a "write track" is simply called a "track" in some cases, "read track" is simply called a "track" in some cases, and "write track" and "read track" are collectively and simply called "tracks" in some cases. There is sometimes a case where "a width of a write track in the radial direction" is called "a write track width" and "width of a read track in the radial direction" is called "a read track width". The "write track width" and "read track width" are collectively called the "track widths" in some cases.

The head 15 is provided with a write head 15W and read head 15R mounted on a slider, the slider serving as a main body of the head 15. The write head 15W writes data to the disk 10. For example, the write head 15W writes a particular track to the disk 10. The read head 15R reads data recorded on the disk 10. For example, the read head 15R reads a particular track of the disk 10.

FIG. 2 is a schematic view showing an example of an arrangement of a head relative to the disk according to this embodiment. As shown in FIG. 2, a direction to the outer circumference of the disk 10 in the radial direction is called an outward direction (outside), and direction opposite to the outward direction is called an inward direction (inside). Further, as shown in FIG. 2, in the circumferential direction, a direction right-handed (clockwise) with respect to the disk 10 is called a rightward direction, and direction opposite (counterclockwise) to the rightward direction is called a leftward direction. In the circumferential direction, a direction in which the disk 10 rotates is called a rotational direction. It should be noted that in the example shown in FIG. 2, although the rotational direction is shown in the leftward direction (counterclockwise direction), the rotational direction may be opposite (rightward direction or clockwise direction) thereto.

The head 15 is moved by the drive of the VCM 14 from the inside toward the outside with respect to the disk 10 to a particular position or is moved from the outside toward the inside to a particular position.

The disk 10 includes a parity area PA. The parity area PA extends from the inner circumference of the disk 10 toward the outer circumference thereof. The parity area PA includes a plurality of parity sectors. For example, each of the plurality of parity sectors includes a plurality of parity data items. The plurality of parity data items respectively correspond to a plurality of tracks written to the disk 10. Accordingly, the parity area PA may continuously be provided in the radial direction of the disk 10 as shown in FIG. 2 or may be provided in a dispersing manner. Hereinafter, "parity data written to the parity sector" or "parity data" is called a "parity sector" in some cases. The disk 10 also includes, for example, a plurality of servo areas not shown. For example, the plurality of servo areas are arranged in such a manner that the servo areas radially extend in the radial directions in a dispersing manner with particular intervals held between them in the circumferential direction. The servo area includes a plurality of servo sectors. In the shingled magnetic recording area 10s of the disk 10, user data and the like are written to an area other than the parity area PA and servo areas. For example, a sector includes a servo sector and data part immediately subsequent to the servo sector.

FIG. 3 is a schematic view showing an example of a shingled magnetic recording area to which data is written. In FIG. 3, only the configurations necessary for the explanation are shown. As shown in FIG. 3, in the radial direction, a direction in which data is sequentially written or read is called a forward direction. The forward direction corresponds to, for example, a direction in which a particular track is overwritten with another track. In FIG. 3, the forward direction is the inward direction. It should be noted that the forward direction may be the outward direction. As shown in FIG. 3, in the circumferential direction, a direction in which read/write is carried out is called a read/write direction. The read/write direction corresponds to a direction in which the head 15 proceeds with respect to the disk 10. In FIG. 3, the read/write direction is the rightward direction. It should be noted that the read/write direction may be the leftward direction.

In the example shown in FIG. 3, the shingled magnetic recording area 10s includes the band area TGn. In FIG. 3, each track in the band area TGn linearly extends for the sake of convenience of explanation. Actually, the tracks in the band area TGn have concentrically circular shapes curved along the shape of the disk 10. That is, actually, the leftward ends of the tracks in the band area TGn and rightward ends of the tracks are coincident with each other. Further, in the tracks in the band area TGn, actually displacements or the like resulting from disturbances or other influences of the structures occur. It should be noted that the shingled magnetic recording area 10s may include two or more band areas.

In the example shown in FIG. 3, the band area TGn includes write tracks WTn, WTn+1, WTn+2, WTn+3, and WTn+4. Part of the write track WTn and part of the write track WTn+1 overlap each other. Part of the write track WTn+1 and part of the write track WTn+2 overlap each other. Part of the write track WTn+2 and part of the write track WTn+3 overlap each other. Part of the write track WTn+3 and part of the write track WTn+4 overlap each other. In the band area TGn, the write tracks WTn to WTn+4 are respectively overwritten with the adjacent tracks in the order mentioned in the radial direction. It should be noted that although the band area TGn is made to include the five tracks, the band area may include tracks of a number less than 5 and may include tracks of a number greater than 5.

The write track WTn includes a track edge EnA and track edge Enb. In the example shown in FIG. 3, the track edge EnA is an end of the write track WTn in the outward direction, and track edge EnB is an end of the write track WTn in the inward direction (forward direction). The write track WTn+1 includes a track edge En+1A and track edge En+1B. In the example shown in FIG. 3, the track edge En+1A is an end of the write track WTn+1 in the outward direction, and track edge En+1B is an end of the write track WTn+1 in the inward direction (forward direction). The write track WTn+2 includes a track edge En+2A and track edge En+2B. In the example shown in FIG. 3, the track edge En+2A is an end of the write track WTn+2 in the outward direction, and track edge En+2B is an end of the write track WTn+2 in the inward direction (forward direction). The write track WTn+3 includes a track edge En+3A and track edge En+3B. In the example shown in FIG. 3, the track edge En+3A is an end of the write track WTn+3 in the outward direction, and track edge En+3B is an end of the write track WTn+3 in the inward direction (forward direction). The write track (final track) WTn+4 includes a track edge En+4A and track edge En+4B. In the example shown in FIG. 3, the track edge En+4A is an end of the write track WTn+4 in the outward direction, and track edge En+4B is an end of the write track WTn+4 in the inward direction (forward direction).

The write track width WWn of the write track WTn is a length between the track edges EnA and EnB in the radial direction. The write track width WWn+1 of the write track WTn+1 is a length between the track edges En+1A and En+1B in the radial direction. The write track width WWn+2 of the write track WTn+2 is a length between the track edges En+2A and En+2B in the radial direction. The write track width WWn+3 of the write track WTn+3 is a length between the track edges En+3A and En+3B in the radial direction. The write track width WWn+4 of the write track WTn+4 is a length between the track edges En+4A and En+4B in the radial direction. The write track widths WWn to WWn+4 are, for example, equal to each other. It should be noted that the write track widths WWn to WWn+4 may be different from each other.

The read track RTn is a remaining area excluding part of the write track WTn overwritten with the write track WTn+1. The read track RTn+1 is a remaining area excluding part of the write track WTn+1 overwritten with the write track WTn+2. The read track RTn+2 is a remaining area excluding part of the write track WTn+2 overwritten with the write track WTn+3. The read track RTn+3 is a remaining area excluding part of the write track WTn+3 overwritten with the write track WTn+4. The read track RTn+4 corresponds to the write track WTn+4. The read track RTn+4 corresponds to the final track in the band area TGn.

The read track width RWn of the read track RTn is a length between the track edges EnA and En+1A in the radial direction. The read track width RWn+1 of the read track RTn+1 is a length between the track edges En+1A and En+2A in the radial direction. The read track width RWn+2 of the read track RTn+2 is a length between the track edges En+2A and En+3A in the radial direction. The read track width RWn+3 of the read track RTn+3 is a length between the track edges En+3A and En+4A in the radial direction. The read track width RWn+4 of the read track RTn+4 is a length between the track edges En+4A and En+4B in the radial direction. That is, the read track width RWn+4 is equal to the write track width WWn+4.

The driver IC 20 controls the drive of the SPM 12 and VCM 14 in accordance with the control of the system controller 130 (more specifically, MPU 60 to be described later).

The head amplifier IC (preamplifier) 30 is provided with a read amplifier and write driver. The read amplifier amplifies a read signal read from the disk 10, and outputs the amplified read signal to the system controller 130 (more specifically, read/write (R/W) channel 40 to be described later). The write driver outputs a write current corresponding to the write data to be output from the R/W channel 40 to the head 15.

The volatile memory 70 is a semiconductor memory in which stored data is lost when the electric power supply is cut off. The volatile memory 70 stores therein data or the like necessary for the processing to be carried out in each section of the magnetic disk device 1. The volatile memory 70 is, for example, a dynamic random access memory (DRAM) or synchronous dynamic random access memory (SDRAM).

The nonvolatile memory 80 is a semiconductor memory in which stored data is kept recorded even when the electric power supply is cut off. The nonvolatile memory 80 is, for example, a NOR-type or NAND-type flash read only memory (FROM).

The buffer memory 90 is a semiconductor memory configured to temporarily record therein data or the like to be delivered from/to the magnetic disk device 1 to/from the host 100 by transmission/reception. It should be noted that the buffer memory 90 may be formed integral with the volatile memory 70. The buffer memory 90 is, for example, a DRAM, static random access memory (SRAM), SDRAM, ferroelectric random access memory (FeRAM), magnetoresistive random access memory (MRAM) or the like.

The system controller (controller) 130 is realized by using, for example, a large-scale integrated circuit (LSI) called a system-on-a-chip (SoC) in which a plurality of elements are integrated into a single chip. The system controller 130 includes a read/write (R/W) channel 40, hard disk controller (HDC) 50, microprocessor unit (MPU) 60, and the like. The R/W channel 40, HDC 50, and MPU 60 are electrically connected to each other. The system controller 130 is electrically connected to, for example, the driver IC 20, head amplifier IC 30, volatile memory 70, nonvolatile memory 80, buffer memory 90, host system 100, and the like.

The R/W channel 40 executes signal processing of read data to be transferred from the disk 10 to the host 100 and write data to be transferred from the host 100 according to an instruction from the MPU 60 to be described later. The R/W channel 40 includes a circuit or function configured to measure the signal quality of the read data. The R/W channel 40 is electrically connected to, for example, the head amplifier IC 30, HDC 50, MPU 60, and the like.

The HDC 50 controls data transfer between the host 100 and R/W channel 40 according to an instruction from the MPU 60 to be described later. The HDC 50 is electrically connected to, for example, the R/w channel 40, MPU 60, volatile memory 70, nonvolatile memory 80, buffer memory 90, and the like.

The MPU 60 is a main controller configured to control each section of the magnetic disk device 1. The MPU 60 controls the VCM 14 through the driver IC 20 to thereby execute servo control of carrying out positioning of the head 15. The MPU 60 controls the SPM 12 through the driver IC 20 to thereby rotate the disk 10. The MPU 60 controls an operation of writing data to the disk 10, and selects a storage destination for storing therein the write data to be transferred from the host 100. Further, the MPU 60 controls an operation of reading data from the disk 10 and controls processing of the read data to be transferred from the disk 10 to the host 100. The MPU 60 is connected to each unit of the magnetic disk device 1. The MPU 60 is electrically connected to, for example, the driver IC 20, R/W channel 40, HDC 50, and the like.

The MPU 60 includes a read/write controller 610, parity data managing unit 620, error-correction controller 630, and the like. The MPU 60 executes the processing of these units, for example, the read/write controller 610, parity data managing unit 620, error-correction controller 630, and the like on the firmware. It should be noted that the MPU 60 may be provided with these sections, for example, the read/write controller 610, parity data managing unit 620, and error-correction controller 630 as circuits.

The read/write controller 610 controls read processing and write processing of data according to a command from the host 100 or the like. The read/write controller 610 controls the VCM 14 through the driver IC 20, positions the head 15 to a particular position on the disk 10, and reads or writes data. For example, the read/write controller 610 carries out a seek on the basis of positional information about the head 15 obtained by reading data of the servo sector provided on the disk 10, positions the head 15 to a targeted radial position (hereinafter referred to as a target position in some cases) of a particular track, and writes data to a particular circumferential position or reads data from a particular circumferential position. In other words, the read/write controller 610 carries out a seek to thereby position the head 15 to a targeted track (hereinafter referred to as a target track in some cases) and write data to a particular sector of the target track or read data from a particular sector of the target track. The read/write controller 610 positions the head 15 to each of a plurality of target positions corresponding to a plurality of circumferential positions arranged concentric with the disk 10 to thereby write particular tracks. Hereinafter, the route of the head 15 indicated by target positions at circumferential positions of the particular tracks is called a target route. When executing shingled magnetic recording, the read/write controller 610 sequentially writes data from a particular sector of a particular band area. When reading a particular band area, the read/write controller 610 sequentially reads data from a particular sector of this band area. Hereinafter, there is also a case where "positioning or placing the central part of the head 15 (write head 15W or read head 15R) to or at a particular position" is simply called "positioning or placing the head 15 (write head 15W or read head 15R) to or at a particular position". Further, "positioning or placing the head 15 (write head 15W or read head 15R) to or at a particular position" is simply called "carrying out positioning" or "carrying out placing" in some cases. It should be noted that the read/write controller 610 may write data not in the shingled magnetic recording scheme in which an adjacent track is overwritten with another track in the radial direction of the adjacent track but in the conventional magnetic recording scheme in which another track is written with a particular interval held between the adjacent track and another track in the radial direction.

The read/write controller 610 controls the write processing on the basis of an error (hereinafter referred to as an offset amount, positioning error or displacement amount) between the target position and actual radial position (hereinafter referred to as an actual position) of the head 15. For example, the read/write controller 610 sets a threshold (hereinafter referred to as a drift-off level (DOL)) of an offset amount (hereinafter referred to as a current offset amount in some cases) corresponding to a track (herein after referred to as a current track in some cases) adjacent to a track previous to the track currently being written in the radial direction (forward direction) on the basis of an offset amount (hereinafter referred to as a previous offset amount in some cases) corresponding to a track (hereinafter referred to as a previous track in some cases) written previously, for example, a track written one track previously to the current track. Hereinafter, a DOL in a direction opposite to the forward direction is simply called a "DOL" in some cases. It should be noted that a DOL in the forward direction is called a "DOL" in some cases. In other words, the read/write controller 610 sets each DOL in each sector of the current track on the basis of each previous offset amount in each sector (each adjacent sector) of the previous track. When an offset amount corresponding to the current track exceeds (or is greater than) the DOL at a particular circumferential position of the current track, the read/write controller 610 interrupts (stops or inhibits) the write processing, then waits for the rotational drive and, thereafter resumes the write processing from the particular circumferential position. In other words, when the current offset amount in the particular sector of the current track exceeds the DOL of this sector, the read/write controller 610 interrupts the processing of writing data to this sector, waits for the rotational drive, and resumes the write processing from this sector. The "processing of stopping, when the offset amount at the particular circumferential position exceeds the DOL of this circumferential position, the processing of writing data to this circumferential position, waiting for the rotational drive, and resuming the write processing from this circumferential position" is called "retry processing" in some cases. The function of controlling the write processing on the basis of the previous offset amount and current offset amount in this manner is called a dynamic drift-off level (DDOL) function or DDOL in some cases.

Figure 4:
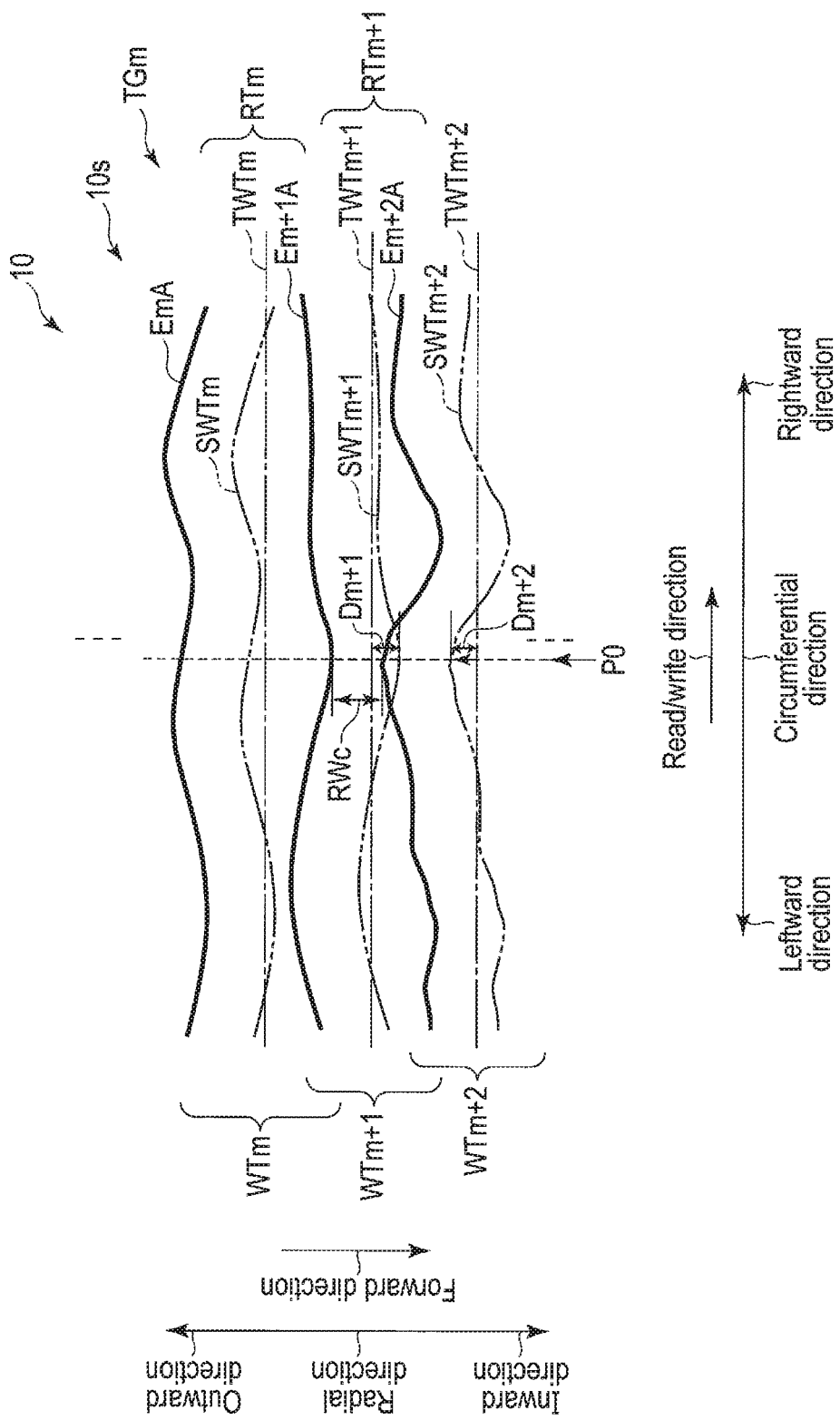
FIG. 4 is a schematic view showing an example of a DDOL.

FIG. 4 is a schematic view showing an example of a DDOL.

In the example shown in FIG. 4, the band area TGm indicates a write track WTm, write track WTm+1, and write track WTm+2. In the band area TGm, the write tracks WTm to WTm+2 are overwritten in this order in the forward direction. In FIG. 4, the target route TWTm and route (hereinafter referred to as an actual route) SWTm of the head 15 indicated by the actual positions at the circumferential positions both of which are in the write track WTm are shown. The write track WTm is written by positioning the head 15 to the actual route SWTm. The write track WTm includes a track edge EmA. The track edge EmA is an end of the write track WTm in the outward direction. In FIG. 4, the target route TWTm+1 and actual route SWTm+1 in the write track WTm+1 are shown. The write track WTm+1 is written by positioning the head 15 to the actual route SWTm+1. The write track WTm+1 includes a track edge Em+1A. The track edge Em+1A is an end of the write track WTm+1 in the outward direction. The read track RTm is arranged between the track edges EmA and Em+1A. In FIG. 4, the target route TWTm+2 and actual route SWTm+2 which are in the write track WTm+2 are shown. The write track WTm+2 is written by positioning the head 15 to the actual route SWTm+2. The write track WTm+2 includes a track edge Em+2A. The track edge Em+2A is an end of the write track WTm+2 in the outward direction. The read track RTm+1 is arranged between the track edges Em+1A and Em+2A. The read track width RWc is a length of the read track RTm+1 in the radial direction at the circumferential position P0. The read track width RWc is, for example, a lower limit of the read track width at which the read track RTm+1 can be read. In FIG. 4, the target routes TWTm, TWTm+1, and TWTm+2 are, for example, routes concentric with the disk 10.

The read/write controller 610 carries out positioning of the head 15, for example, the write head 15W in such a manner that the write head 15W follows the target route TWTm to thereby write the write track WTm. Actually, when writing the write track WTm, the write head 15W travels along the actual route SWTm. Accordingly, the read/write controller 610 writes the write track WTm on the basis of the actual route SWTm.

The read/write controller 610 carries out positioning of the head 15, for example, the write head 15W in such a manner that the write head 15W follows the target route TWTm+1 to thereby write the write track WTm+1. Actually, when writing the write track WTm+1, the write head 15W travels along the actual route SWTm+1. Accordingly, the read/write controller 610 writes the write track WTm+1 on the basis of the actual route SWTm+1. In writing the write track WTm+1, the read/write controller 610 has carried out writing while deviating in the forward direction by an amount corresponding to the offset amount Dm+1 at the circumferential position P0.

The read/write controller 610 carries out positioning of the head 15, for example, the write head 15W in such a manner that the write head 15W follows the target route TWTm+2 to thereby write the write track WTm+2. Actually, when writing the write track WTm+2, the write head 15W travels along the actual route SWTm+2. Accordingly, the read/write controller 610 writes the write track WTm+2 on the basis of the actual route SWTm+2. In writing the write track WTm+2, the read/write controller 610 has carried out writing while deviating in the direction (outward direction) opposite to the forward direction by an amount corresponding to the offset amount Dm+2 at the circumferential position P0.

The read/write controller 610 sets the DOL of the write track WTm+2 at the circumferential position P0 on the basis of, for example, the offset amount Dm+1 of the write track WTm+1 at the circumferential position P0. When the offset amount Dm+2 exceeds the DOL of the write track WTm+2 at the circumferential position P0, the read/write controller 610 interrupts (or stops) the write processing, waits for the rotational drive of the disk 10, and resumes the write processing from the circumferential position P0 of the write track WTm+2.

The parity data managing unit 620 manages the XOR-calculated value (hereinafter referred to as parity data or calculated value) acquired by an EXCLUSIVE-OR (XOR) operation. For example, the parity data managing unit 620 executes an XOR operation on the data transferred from the host 100 or data read from the disk 10, and acquires parity data as a result of the XOR operation. The parity data managing unit 620 writes the parity data to a particular sector of a particular track of the disk 10, for example, a parity sector (parity area PA) through the read/write controller 610. In one example, the parity data managing unit 620 executes the XOR operation on the data of all the sectors read from a particular track or to be written to the particular track, and writes the parity data acquired as a result of the XOR operation executed on the data of all the sectors to the parity sector of this track. The parity data managing unit 620 writes the parity data to the sectors other than the servo sector located at a position immediately before the sector (hereinafter referred to as a starting sector in some cases) at which the processing of writing data to be written to, for example, a particular track throughout one round thereof has been started while using the sectors other than the servo sector as parity sectors. In other words, the parity data managing unit 620 writes the parity data to the sectors other than the servo sector located at a position immediately behind the sector (hereinafter referred to as an ending sector in some cases) at which the processing of writing data to be written to, for example, a particular track throughout one round thereof has been ended while using the sectors other than the servo sector as parity sectors. The parity data managing unit 620 writes the parity data items corresponding to the tracks of the disk 10 to the parity sectors corresponding to the tracks. It should be noted that the parity data managing unit 620 may manage whether or not the parity data is valid by means of a table or the like. Further, the parity data managing unit 620 may execute the XOR operation on the data of each group of several sectors in all the sectors of a particular track, and may record the parity data acquired as a result of the XOR operation executed on the data of the several sectors in a particular recording area, for example, the shingled magnetic recording area 10s, media cache 10m, volatile memory 70, nonvolatile memory 80 or buffer memory 90.

The error-correction control the section 630 detects data (hereinafter referred to as read-error data) written to a sector (hereinafter referred to as a read-error sector) unreadable at the time of read processing or unreadable in spite of reading of a particular number of times or more, and corrects (hereinafter referred to as an error correction or correction) the error of the detected read-error data. Hereinafter, the "read-error data written to a read-error sector" and "read-error data" are called "read-error sector" in some cases. The error-correction controller 630 executes an error correction in units of, for example, tracks. Upon detection of a read-error sector in a particular track, the error-correction controller 630 corrects the detected read-error sector on the basis of parity data (parity sector) corresponding to this track. The processing of executing an error correction of the read-error sector on the basis of the parity data (parity sector) is called track error correction code (Track ECC) in some cases. The error-correction controller 630 can execute an error correction of read-error sectors of a particular number (hereinafter referred to as the number of to-be-corrected sectors in some cases) in a plurality of read-error sectors which have occurred in the particular track on the basis of the parity data corresponding to this track. In one example, the error-correction controller 630 can execute an error correction of five (number of to-be-corrected sectors=5) read-error sectors on the basis of the parity data corresponding to the particular track. It should be noted that the error-correction controller 630 may be able to execute an error correction of read-error sectors of the number of to-be-corrected sectors (number of to-be-corrected sectors<5) less than five on the basis of the parity data corresponding to the particular track or may be able to execute an error correction of six or more (number of to-be-corrected sectors≥6) read-error sectors. It should be noted that the error-correction controller 630 may execute an error correction on the basis of an error-correcting code.

The error-correction controller 630 sets (or determines) the order (hereinafter referred to as a priority number in some cases) in which an error correction is made to a plurality of sectors of a particular track, for example, all the sectors on a priority basis. Regarding the priority number, the higher the degree of priority (hereinafter referred to as a correction-object priority degree in some cases) for making an error correction, the less is the priority number. The error-correction controller 630 sets priority numbers to the sectors of the previous track on the basis of the offset amounts of the sectors of the previous track or DOLs of the sectors of the current track. For example, the error-correction controller 630 sets priority numbers to the sectors of the previous track in decreasing order of offset amount in the forward direction. For example, the error-correction controller 630 sets priority numbers to the sectors of the previous track in increasing order of DOL in the sectors of the current track adjacent in the forward direction. The error-correction controller 630 may record the sectors of the previous track and priority numbers set to the sectors of the previous track in correlation with each other as a table in a particular recording area, for example, the media cache area 10m, volatile memory 70, nonvolatile memory 80 or the like. The error-correction controller 630 sets at least one of the sectors of the previous track in the order from the number of the least (smallest) priority number to the particular priority number as sectors (hereinafter referred to as correction-object sectors in some cases) to which error corrections are to be made at the time of occurrence of a read error on the basis of the DOLs of the sectors of the current track and estimated value (hereinafter referred to as a maximum offset estimate in some cases) of the maximum offset amount on the previous track side of the current track, i.e., in the direction opposite to the forward direction. The maximum offset estimate is constant in, for example, a particular track. It should be noted that the maximum offset estimate may vary from sector to sector in the particular track. The error-correction controller 630 may measure (determine) or calculate the maximum offset estimates corresponding to the heads 15 and tracks of the disks 10 by a test or the like, and may record the measured/calculated maximum offset estimates corresponding to the heads 15 and tracks of the disks 10 in a particular recording area, for example, the media cache area 10m, volatile memory 70, nonvolatile memory 80 or the like. For example, the error-correction controller 630 sets at least one of the sectors of the previous track in the order from the sector of the least priority number to the number of the to-be-corrected sectors as correction-object sectors, at least one of the sectors of the previous track being correspondent to at least one of the sectors of the current track each having DOLs less than the maximum offset estimates. The error-correction controller 630 may record at least the one correction-object sector in a particular recording area, for example, the media cache area 10m, volatile memory 70, nonvolatile memory 80 or the like as a table. The error-correction controller 630 sets at least one sector of the current track adjacent to at least one correction-object sector in the forward direction as a correction-object associated sector. While writing data to a particular correction-object associated sector, if the offset amount in the correction-object associated sector exceeds the DOL corresponding to this correction-object associated sector, the error-correction controller 630 suppresses or stops the "processing (retry processing) of interrupting (stopping or inhibiting) the processing of writing data to this correction-object associated sector, waiting for the rotational drive, and resuming the write processing from this correction-object associated sector". In other words, while writing data to a particular correction-object associated sector, even if the offset amount in this correction-object associated sector exceeds the DOL in this correction-object associated sector, the error-correction controller 630 continues the write processing. Upon determination that the particular correction-object sector is a read-error sector, the error-correction controller 630 makes an error correction to the correction-object sector determined to be a read-error sector. The error-correction controller 630 sets at least one of the sectors of the previous track other than the correction-object sector as a sector (hereinafter referred to as a non-object sector in some cases) on which retry processing is to be executed when the offset amount exceeds the DOL. It should be noted that at least one of the sectors of the previous track other than the correction-object sector of the previous track and having an offset amount less than the maximum offset estimate may be set as a non-object sector. The error-correction controller 630 sets at least one of the sectors of the current track adjacent to at least one non-object sector in the forward direction as a non-object associated sector. The error-correction controller 630 may record at least the one non-object sector as a table in a particular recording area, for example, the media cache area 10m, volatile memory 70, nonvolatile memory 80 or the like. While writing data to at least one non-object associated sector, if the offset amount in the particular non-object associated sector exceeds the DOL in this non-object associated sector, the error-correction controller 630 executes the retry processing of interrupting the processing of writing data to this non-object associated sector, waiting for the rotational drive, and resuming the write processing from this non-object associated sector.

FIG. 5 is a schematic view showing an example of an error-correcting method for each track according to this embodiment.

In FIG. 5, a track TRn is shown. The track TRn may be one write track or read track of a particular band area or may be a track written in the conventional magnetic recording scheme. For example, the track TRn may be the write track WTn shown in FIG. 3 or may be the read track RTn shown in FIG. 3. In FIG. 5, although the track TRn has a circular shape concentric with the disk 10, the track TRn may have a shape other than the circular shape. The track TRn includes sectors Sn0, Sn1, Sn2, Sn3, Sn4, Sn5, Sn6, Sn7, Sn8, Sn9, . . . , Snn, and parity sector PSn. In FIG. 5, the sector Sn0 corresponds to the starting sector, and sector Snn corresponds to the ending sector. It should be noted that the track TRn may further include other sectors or may not include some of the sectors Sn0 to Snn. In FIG. 5, the sector Sn8 is a read-error sector.

The read/write controller 610 firstly writes the user data to, for example, the sector Sn0 in the track TRn. The read/write controller 610 writes the user data to the sectors Sn0 to Snn in the read/write direction.

The parity data managing unit 620 executes the XOR operation on a plurality of user data items respectively corresponding to the sectors Sn0 to Snn to thereby calculate the parity data as a result of the XOR operation executed on the plurality of user data items respectively corresponding to the sectors Sn0 to Snn.

The parity data managing unit 620 writes the parity data corresponding to the sectors Sn0 to Snn to the parity sector PSn, the parity sector PSn being positioned, in the read/write direction, next to (adjacent to) the sector Snn to which the user data has lastly been written in the track TRn.

The read/write controller 610 carries out read of the sectors Sn0 to Snn in the read/write direction.

The error-correction controller 630 detects a read error of the read-error sector Sn8 and corrects the read error data written to the read-error sector Sn8 on the basis of the parity data written to the parity sector PSn.

Figures 6A, 6B:
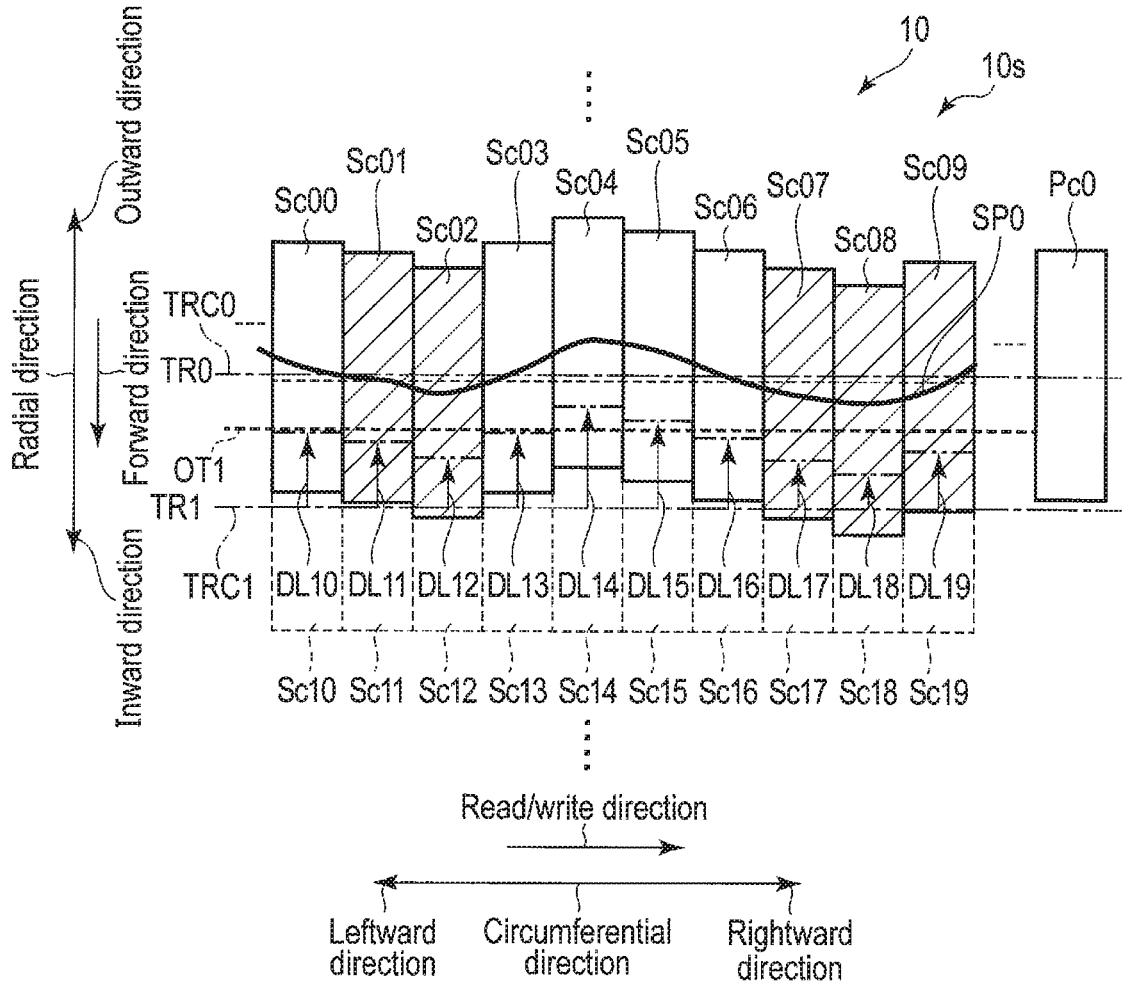
FIG. 6A is a schematic view showing an example of a method of setting a correction-object sector according to the first embodiment.
FIG. 6B is a schematic view showing an example of a table of priority numbers set to sectors of a particular track according to the first embodiment.

FIG. 6A is a schematic view showing an example of a method of setting a correction-object sector according to this embodiment. FIG. 6B is a schematic view showing an example of a table TB1 of priority numbers set to sectors of a particular track according to this embodiment. In FIG. 6A, a track TR0 and track TR1 are shown. In FIG. 6A, a state where the track TR0 has been written and, thereafter write processing of the track TR1 adjacent to the track TR0 in the forward direction is to be started is shown. That is, assuming that the track TR1 is the current track, the track TR0 corresponds to the previous track. The track TR0 includes sectors Sc00, Sc01, Sc02, Sc03, Sc04, Sc05, Sc06, Sc07, Sc08, Sc09, . . . , and, parity sector Pc0.

It should be noted that the track TR0 may further include a plurality of sectors in addition to the sectors Sc00 to Sc09 and parity sector Pc0 or may not include some of the sectors Sc00 to Sc09. In FIG. 6A, the sectors Sc00 to Sc09 are consecutively arranged in the read/write direction. That is, the sector Sc01 is adjacent to sector Sc00 in the read/write direction, sector Sc02 is adjacent to sector Sc01 in the read/write direction, sector Sc03 is adjacent to sector Sc02 in the read/write direction, sector Sc04 is adjacent to sector Sc03 in the read/write direction, sector Sc05 is adjacent to sector Sc04 in the read/write direction, sector Sc06 is adjacent to sector Sc05 in the read/write direction, sector Sc07 is adjacent to sector Sc06 in the read/write direction, sector Sc08 is adjacent to sector Sc07 in the read/write direction, and sector Sc09 is adjacent to sector Sc08 in the read/write direction. In FIG. 6A, the target route (track center) TRC0 at the time of writing the track TR0 and actual route SP0 at the time of writing the track TR0 are shown. In FIG. 6A, the target route TRC0 is, for example, a route concentric with the disk 10. The actual route SP0 extends in the circumferential direction, and varies in the radial direction with respect to the target route TRC0. The actual route SP0 corresponds to a route passing through the central parts of the sectors Sc00 to Sc09. The track TR1 includes sectors Sc10, Sc11, Sc12, Sc13, Sc14, Sc15, Sc16, Sc17, Sc18, and Sc19. It should be noted that the track TR1 may further include a plurality of sectors in addition to the sectors Sc10 to Sc19 or may not include some of the sectors Sc10 to Sc19. In FIG. 6A, the sectors Sc10 to Sc19 are consecutively arranged in the read/write direction. That is, the sector Sc11 is adjacent to sector Sc10 in the read/write direction, sector Sc12 is adjacent to sector Sc11 in the read/write direction, sector Sc13 is adjacent to sector Sc12 in the read/write direction, sector Sc14 is adjacent to sector Sc13 in the read/write direction, sector Sc15 is adjacent to sector Sc14 in the read/write direction, sector Sc16 is adjacent to sector Sc15 in the read/write direction, sector Sc17 is adjacent to sector Sc16 in the read/write direction, sector Sc18 is adjacent to sector Sc17 in the read/write direction, and sector Sc19 is adjacent to sector Sc18 in the read/write direction. In FIG. 6A, the sector Sc10 is adjacent to sector Sc00 in the forward direction, sector Sc11 is adjacent to Sc01 in the forward direction, sector Sc12 is adjacent to Sc02 in the forward direction, sector Sc13 is adjacent to Sc03 in the forward direction, sector Sc14 is adjacent to Sc04 in the forward direction, sector Sc15 is adjacent to Sc05 in the forward direction, sector Sc16 is adjacent to Sc06 in the forward direction, sector Sc17 is adjacent to Sc07 in the forward direction, sector Sc18 is adjacent to Sc08 in the forward direction, and sector Sc19 is adjacent to Sc09 in the forward direction. In FIG. 6A, the target route (track center) TRC1 of the track TR1 is shown. In FIG. 6A, the target route TRC1 is, for example, a route concentric with the disk 10. In FIG. 6A, although the sectors Sc10 to Sc19 are arranged along the target route TRC1 for the sake of convenience of explanation, when the track TR1 is actually written, the sectors Sc10 to Sc19 can possibly be arranged by being respectively deviated from the target route TRC1. In FIG. 6A, the maximum offset estimate OT1 in the track TR1 is shown. Further, in FIG. 6A, a DOL in the sector Sc10, i.e., DL10, DOL in sector Sc11, i.e., DL11, DOL in sector Sc12, i.e., DL12, DOL in sector Sc13, i.e., DL13, DOL in sector Sc14, i.e., DL14, DOL in sector Sc15, i.e., DL15, DOL in sector Sc16, i.e., DL16, DOL in sector Sc17, i.e., DL17, DOL in sector Sc18, i.e., DL18, and DOL in sector Sc19, i.e., DL19 are shown. In FIG. 6A, magnitude relationships between the DOLs are shown as follows.

DL14>DL15>DL13>DL10>DL16>DL11>DL19>DL12>DL17>DL18

In FIG. 6B, a table TB1 including the sector numbers of the sectors of the previous track and priority numbers corresponding to the sector numbers of the sectors of the previous track is shown. Sector numbers arranged in, for example, a radial direction are equal to each other.

In the example shown in FIG. 6A, when (or before) writing the track TR1 separately from the track TR0 in the forward direction after writing the track TR0, the error-correction controller 630 sets priority numbers to the sectors Sc00 to Sc09 respectively adjacent to the sectors Sc10 to Sc19 in the direction opposite to the forward direction on the basis of the offset amounts of the sectors of the track TR0, for example, the sectors Sc00 to Sc09. It should be noted that the when (or before) writing the track TR1 separately from the TR0 in the forward direction after writing the track TR0, the error-correction controller 630 may set priority numbers to the sectors Sc00 to Sc09 respectively adjacent to the sectors Sc10 to Sc19 in the direction opposite to the forward direction on the basis of the DOLs, for example, the DOLs DL10 to DL19 of the sectors of the track TR1, for example, the sectors Sc10 to Sc19. The error-correction controller 630 sets the priority number 0 to the sector Sc08, priority number 1 to sector Sc07, priority number 2 to sector Sc02, priority number 3 to sector Sc09, priority number 4 to sector Sc01, priority number 5 to sector Sc06, priority number 6 to sector Sc00, priority number 7 to sector Sc03, priority number 8 to sector Sc05, and priority number 9 to sector Sc04. As shown in FIG. 6B, the error-correction controller 630 records the sectors Sc00 to Sc09 and priority numbers respectively set to the sectors Sc00 to Sc09 in correlation with each other as a table TB1 in a particular recording area, for example, the media cache area 10m, volatile memory 70, nonvolatile memory 80 or the like. The error-correction controller 630 sets, as correction-object sectors, the sectors Sc08, Sc07, Sc02, Sc09, and Sc01 of the number of to-be-corrected sectors, for example, all of which are arranged in ascending order of priority number and belong to the sectors of the previous track, i.e., Sc00, Sc01, Sc02, Sc03, Sc06, Sc07, Sc08 and Sc09 respectively adjacent, in the direction opposite to the forward direction, to the sectors Sc10, Sc11, Sc12, Sc13, Sc16, Sc17, Sc18, and Sc19 respectively corresponding to the DOLs DL10, DL11, DL12, DL13, DL16, DL17, DL18, and DL19 less than the maximum offset estimate OT1. The error-correction controller 630 sets, as correction-object associated sectors, the sectors Sc18, Sc17, Sc12, Sc19, and Sc11 respectively adjacent, in the forward direction, to the correction-object sectors Sc08, Sc07, Sc02, Sc09, and Sc01.

When starting the write processing of the track TR1, even if the offset amount in the correction-object associated sector Sc18, Sc17, Sc12, Sc19 or Sc1l exceeds the DOL DL18, DL17, DL12, DL19 or DL11 in the correction-object associated sector Sc18, Sc17, Sc12, Sc19 or Sc11, the error-correction controller 630 continues the processing of writing data to the correction-object associated sector Sc18, Sc17, Sc12, Sc19 or Sc11. Upon determination that at least one of the correction-object sectors Sc08, Sc07, Sc02, Sc09, and Sc01 is a read-error sector, the error-correction controller 630 makes an error correction to at least one sector determined to be a read-error sector on the basis of the parity sector Pc0.

When starting the write processing of the track TR1, if the offset amount in the non-object associated sector Sc10, Sc13, Sc14, Sc15 or Sc16 exceeds the DOL DL10, DL13, DL14, DL15 or DL16 in the non-object associated sector Sc10, Sc13, Sc14, Sc15 or Sc16, the error-correction controller 630 executes the retry processing of interrupting the processing of writing data to the non-object associated sector Sc10, Sc13, Sc14, Sc15 or Sc16, waiting for the rotational drive, and resuming the write processing from the non-object associated sector Sc10, Sc13, Sc14, Sc15 or Sc16.

As described above, by making the sectors of the previous track respectively adjacent to the sectors of the current track having small DOLs in the direction opposite to the forward direction objects of an error correction, and suppressing the retry processing in the sectors of the current track having the small DOLs, the occurrence frequency of the retry processing can be reduced. Further, the occurrence frequency of the retry processing can be reduced, whereby it becomes possible to consecutively write the sectors and thus to write a smooth track without breaks. Accordingly, it becomes possible to improve the write performance.

FIG. 7 is a block diagram showing an example of a positioning control system SY of the head 15 at the time of write processing according to this embodiment.

The magnetic disk device 1 includes a positioning control system (hereinafter referred to as a write control system) SY of the head 15 to be used at the time of write processing. The write control system SY includes a converter A1, controller A2, actuator A3, memory A4, operational comparator A5, AND-circuit unit A6, checker A7, table B1, AND-circuit unit A8, counter A9, operational comparator A10, and computing units CL1, CL2, and CL3. The converter A1, controller A2, memory A4, operational comparator A5, AND-circuit unit A6, checker A7, table B1, AND-circuit unit A8, counter A9, operational comparator A10, computing unit CL1, computing unit CL2, and computing unit CL3 are included in, for example, the system controller 130, media cache 10m, volatile memory 70, nonvolatile memory 80, and buffer memory 90. The actuator A3 is constituted of, for example, the arm 13, VCM 14, and the like. The memory A4 is included in, for example, the volatile memory 70, nonvolatile memory 80 or buffer memory 90. The table B1 may correspond to, for example, the table TB1. The computing unit CL1, controller A2, and actuator A3 constitute a feedback system.

In FIG. 7, a particular sector (hereinafter referred to as a current sector in some cases)(C, S) written in the current track (track number C), sector number S corresponding to the current sector, target position X in the current sector (C, S), offset amount X1 (C, S) in the current sector, offset amount X0 (C-1, S) in a particular sector (hereinafter referred to as a previous sector in some cases)(C-1, S) of the previous track (track number C-1) adjacent to the current sector (C, S) in the direction opposite to the forward direction, and set of offset amounts X0 (C-1, [0, 1, 2, . . . , Ns−1]) of all the sectors (number of sectors Ns) in the track C-1 are all processed in the write control system SY as signals (or information). Further, the reference DOL (hereinafter referred to as a reference DOL in some cases) D0 of all the sectors, DOL D1 (C, S) of the current sector (C, S) corrected on the basis of the offset amount X0 (C-1, S), flag F0 indicating that the DOL is exceeded in the current sector (C, S), flag F1 indicating that the write inhibit suppression function premised on the correction based on Track ECC is invalidated, flag F2 indicating that write is inhibited, flag F3 indicating a correction-object sector, flag F4 indicating that an event in which the DOL is exceeded in the current sector (C, S) is valid, number N of the correction-object sectors, upper limit NO of the number of correction-object sectors, write error (offset amount) e in the current sector, write drive amount U in the current sector, and actual position Y of the head 15 in the current sector are respectively processed as signals (or information) in the write control system SY. The sector numbers S of sectors adjacent to each other in the radial direction can be the same number. The offset amount X0 (C-1, S) corresponds to an offset amount X1 (C-1, S) (not shown) in the previous sector (C-1, S). The offset amounts X0 (C-1, [0, 1, 2, . . . , Ns−1]) of all the sectors in the track C-1 correspond to the offset amounts X1 (C-1, [0, 1, 2, . . . , Ns−1]) (not shown) of all the sectors in the previous track C-1. The offset amount X1 (C, S) corresponds to the positional error signal in the current sector.

The converter A1 converts a physical position (hereinafter referred to as a physical position) corresponding to a logical position (hereinafter referred to as a logical position) of the disk 10 designated by a higher-level device, for example, the host 100 into a radial position of the disk 10. The logical position may be, for example, a logical block address (LBA), and physical position may be, for example, a servo information array indicating the physical positions of the disk 10. The converter A1 converts a combination (C, S) of a track C to which the head 15 is positioned on the basis of the servo information array (C: track or cylinder, S: sector) corresponding to the LBA designated by, for example, the host 100, the track C being one of a plurality of concentric tracks of the disk 10, and sector number S corresponding to the current sector in a plurality of sectors of the track C into a target position X at the sector number S corresponding to the current sector.

The controller A2 controls the actuator A3. The controller A2 generates a drive amount (hereinafter referred to as a write drive amount) U of the head 15 at the time of write processing of the actuator A3 on the basis of, for example, a write error e which is a value of a difference (difference value) between the target position X and actual position Y. It should be noted that the controller A2 may generate the write drive amount U on the basis of a value other than the write error e.

The actuator A3 carries out drive according to the output of the controller A2. The actuator A3 carries out drive on the basis of, for example, the write drive amount U to thereby move the head 15 to the actual position Y in the current sector.

The memory A4 stores therein each positional error signal (offset amount) X1 (C-1, S) (not shown) of each sector (C-1, S) at the time when the previous track C-1 has been written, and outputs the stored positional error signals as a set of the offset amounts X0 (C-1, [0, 1, 2, . . . , Ns-1]) of all the sectors in the previous track C-1 or as the offset amount X0 (C-1, S) of the previous sector (C-1, S) included in the aforementioned set of the offset amounts X0 (C-1, [0, 1, 2, . . . , Ns-1]) with respect to the servo information array (C, S) corresponding to the LBA designated by the host 100. Further, when the sector (C, S) is written, the offset amount X1 (C, S) is newly stored.

The operational comparator A5 compares the DOL D1 (C, S) in the current sector and offset amount X1 (C, S) in the current sector with each other and, when the offset amount X1 (C, S) exceeds the DOL D1 (C, S), generates a flag F0.

The AND-circuit unit A6 generates a flag F2 when the flags F0 and F1 are input.

The checker A7 sets priority numbers to the sector numbers in the order from the greatest to the least in the offset amounts X0 (C-1, [0, 1, 2, . . . , Ns-1]) of all the sectors in the previous track C-1 (or in the order from the least to the greatest in the DOLs D1 (C, [0, 1, 2, . . . , Ns-1]) of all the sectors in the current track C), and generates a table B1 in which the sector numbers of the sectors of the previous track and priority numbers corresponding to the sector numbers of the sectors of the previous track C-1 are correlated with each other. The checker A7 compares the sector number S of the current sector (C, S) and table B1 with each other and, when the previous sector (C-1, S) is a correction-object sector, generates a flag F3.

The AND-circuit unit A8 generates a flag F4 when the flags F0 and F3 are input.

The counter A9 counts the number N of correction-object sectors on the previous track C-1.

The operational comparator A10 compares the number N of the correction-object sectors on the previous track C-1 and upper limit NO of the number N of the correction-object sectors with each other and, when the number N of the correction-object sectors exceeds the upper limit NO of the number of correction-object sectors, generates a flag F1.

When the logical position of the disk 10 at which data is to be written, for example, the LBA is designated by a higher-level device, for example, the host 100, the write control system SY converts the LBA into a physical position (C, S) in advance, outputs the current sector (C, S) to the converter A1 and memory A4, and outputs the sector number S of the current sector to the checker A7. To the converter A1, the position (C, S) is input. The converter A1 converts the position (C, S) into the target position X, and outputs the converted target position X to the computing units CL1 and CL2. To the computing unit CL1, the target position X and actual position Y are input. The computing unit CL1 calculates a write error e from the difference between the target position X and actual position Y, and outputs the calculated write error e to the controller A2. To the controller A2, the write error e is input. The controller A2 outputs the write drive amount U to the actuator A3. To the Actuator A3, the write drive amount U is input. The actuator A3 carries out drive according to the write drive amount U, and moves the head 15, for example, write head 15W to the actual position Y corresponding to the write drive amount U. The actuator A3 outputs the actual position Y to the computing units CL1 and CL2.

To the computing unit CL2, the target position X and actual position Y are input. The computing unit CL2 calculates an offset amount X1 (C, S) from the difference between the target position X and actual position Y, and outputs the calculated offset amount X1 (C, S) to the operational comparator A5. To the memory A4, the current sector (C, S) is input. The memory A4 outputs the set of the offset amounts X0 (C-1, [0, 1, 2, . . . , Ns-1]) of all the sectors (C-1, [0, 1, 2, . . . , Ns-1]) on the previous track C-1 adjacent to the current track in the direction opposite to the forward direction to the checker A7. Further, the memory A4 outputs the offset amount X0 (C-1, S) of the previous sector adjacent to the current sector (C, S) in the direction opposite to the forward direction to the computing unit CL3. To the computing unit CL3, the offset amount X0 (C-1, S) and reference DOL D0 are input. The computing unit CL3 outputs a DOL D1 (C, S) corresponding to the current sector and obtained by adding the reference DOL D0 to the offset amount X0 (C-1, S) to the operational comparator A5. To the operational comparator A5, the offset amount X1 (C, S) and DOL D1 (C, S) in the current sector are input. The operational comparator A5 compares the offset amount X1 (C, S) and DOL D1 (C, S) in the current sector with each other and, when the offset amount X1 (C, S) exceeds the DOL D1 (C, S) in the current sector, outputs a flag F0 to the AND-circuit units A6 and A8.

To the checker A7, the sector number S and set of the offset amounts X0 (C-1, [0, 1, 2, . . . , Ns-1]) of all the sectors (C-1, [0, 1, 2, . . . , Ns-1]) on the track C-1 are input. The checker A7 refers to the table B1 and, when the previous sector (C-1, S) is a correction-object sector, outputs a flag F3 to the AND-circuit unit A8. To the AND-circuit unit A8, the flags F0 and F3 are input. When the flags F0 and F3 are input, the AND-circuit unit A8 outputs a flag F4 to the counter A9. To the counter A9, the flag F4 is input. The counter A9 counts the number N of the correction-object sectors, and outputs the number N of the correction-object sectors to the operational comparator A10. To the operational comparator A10, the number N of the correction-object sectors and upper limit NO of the number of the correction-object sectors are input. The operational comparator A10 compares the number N of the correction-object sectors and upper limit NO of the number of the correction-object sectors with each other and, when the number N of the correction-object sectors is greater than the upper limit NO of the number of the correction-object sectors, outputs a flag F1 to the AND-circuit unit A6. To the AND-circuit unit A6, the flags F0 and F1 are input. When the flags F0 and F1 are input, the AND-circuit unit A6 outputs a flag F2.

Figure 8:
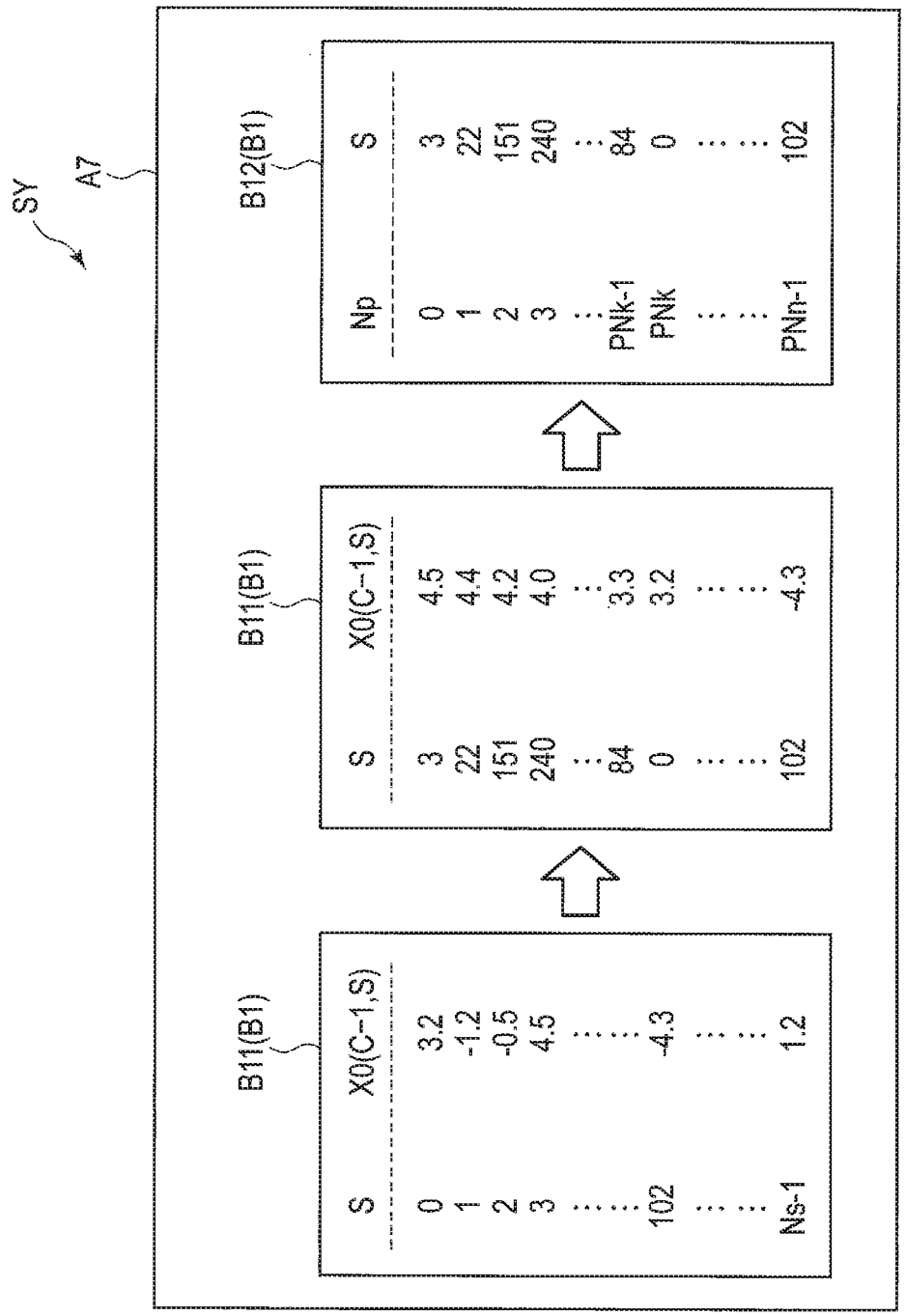
FIG. 8 is a schematic view showing an example of processing of a checker shown in FIG. 7.

FIG. 8 is a schematic view showing an example of the processing of the checker A7 shown in FIG. 7. In FIG. 8, the table B1 includes the table B11 and table B12. The table B11 includes the sector numbers S (S=0, 1, 2, . . . , Ns−1) of all the sectors (number of sectors: Ns) included in the previous track C-1 and offset amount X0 (C-1, S) in the previous sector corresponding to the above. In the table B11, the sector number Ns−1 is greater than the sector number 102. The table B12 includes the priority numbers Np (Np=0, 1, 2, . . . , PNn−1) and sector numbers S. In general, the number PNn of pieces of the priority numbers is equal to the number Ns of all the sectors. In the table B12, the priority number PNk−1 is greater than priority number 3, priority number PNk is greater than priority number PNk−1, and priority number PNn−1 is greater than priority number PNk.

The sector numbers S and a set of the offset amounts X0 (C-1, [0, 1, 2, . . . , Ns−1]) of all the sectors (C-1, [0, 1, 2, . . . , Ns−1]) on the previous track are input to the checker A7, and checker A7 generates a table B11. The checker A7 rearranges the sector numbers S in decreasing order of offset amount X0 (C-1, S) in the table B11. The checker A7 sets the priority numbers Np to the sector numbers S in decreasing order of offset amount X0 (C-1, S) in the table B11. Alternatively, the checker A7 generates the DOL D1 (C, S) in the current sector (C, S) on the basis of the sector numbers S and offset amount X0 (C-1, S) of the previous sector, and records the sector numbers S, offset amount X0 (C-1, S), and DOL D1 (C, S) in the current sector (C, S) in correlation with each other in the table B11. The checker A7 rearranges the sector numbers S in ascending order of DOL D1 (C, S) in the current sector (C, S) in the table B11. The checker A7 may set the priority numbers Np to the sector numbers S in ascending order of DOL D1 (C, S) of the current sector (C, S) in the table B11.

Figure 9:
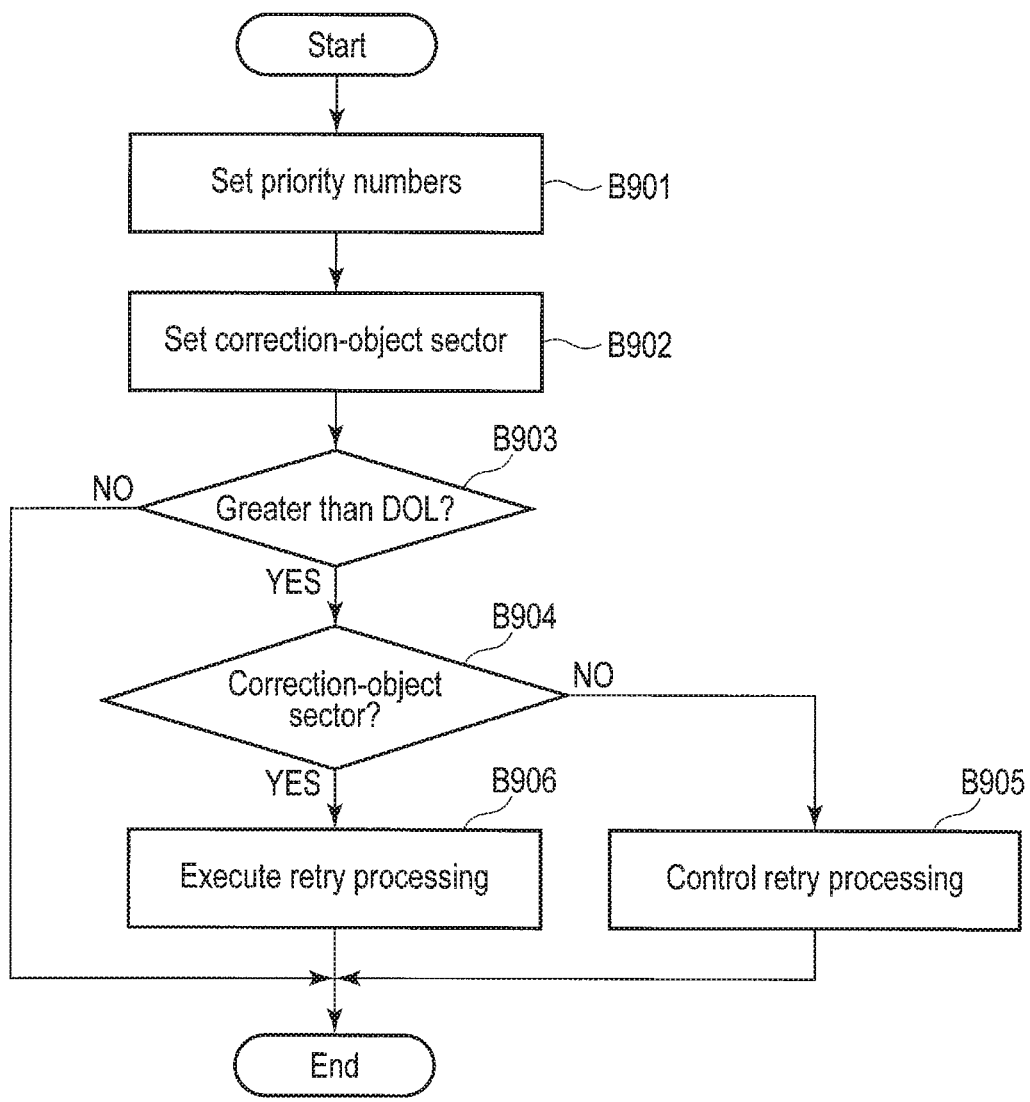
FIG. 9 is a flowchart showing an example of a write processing method according to the first embodiment.

FIG. 9 is a flowchart showing an example of a write processing method according to this embodiment.

The MPU 60 sets priority numbers to the sectors of the previous track on the basis of the offset amounts in the sectors of the previous track or on the basis of the DOLs in the sectors of the current track (B901). The MPU 60 sets at least one of the sectors of the previous track in the order from the number of the least priority number to the particular priority number as correction-object sectors on the basis of the DOLs in the sectors of the current track and maximum offset estimate in the current track (B902). For example, the MPU 60 sets at least one of the sectors of the previous track in the order from the number of the least priority number to the number of to-be-corrected sectors as correction-object sectors on the basis of the DOLs in the sectors of the current track and maximum offset estimate in the current track. The MPU 60 determines whether the offset amount in the current sector is greater than or is less than or equal to the DOL in the current sector (B903). Upon determination that the offset amount in the current sector is less than or equal to the DOL in the current sector (NO of B903), the MPU 60 terminates the processing. Upon determination that the offset amount in the current sector is greater than the DOL in the current sector (YES of B903), the MPU 60 determines whether or not the previous sector adjacent to the current sector in the direction opposite to the forward direction is a correction-object sector (B904). Upon determination that the previous sector is not a correction-object sector, i.e., that the previous sector is, e.g., a non-object sector (NO of B904), the MPU 60 executes the retry processing on the current sector (B905), and then terminates the processing. Upon determination that the previous sector is a correction-object sector (YES of B904), the MPU 60 suppresses (or interrupts) the retry processing in the current sector and continues the processing of writing data to the current sector (B906).

Figure 10:
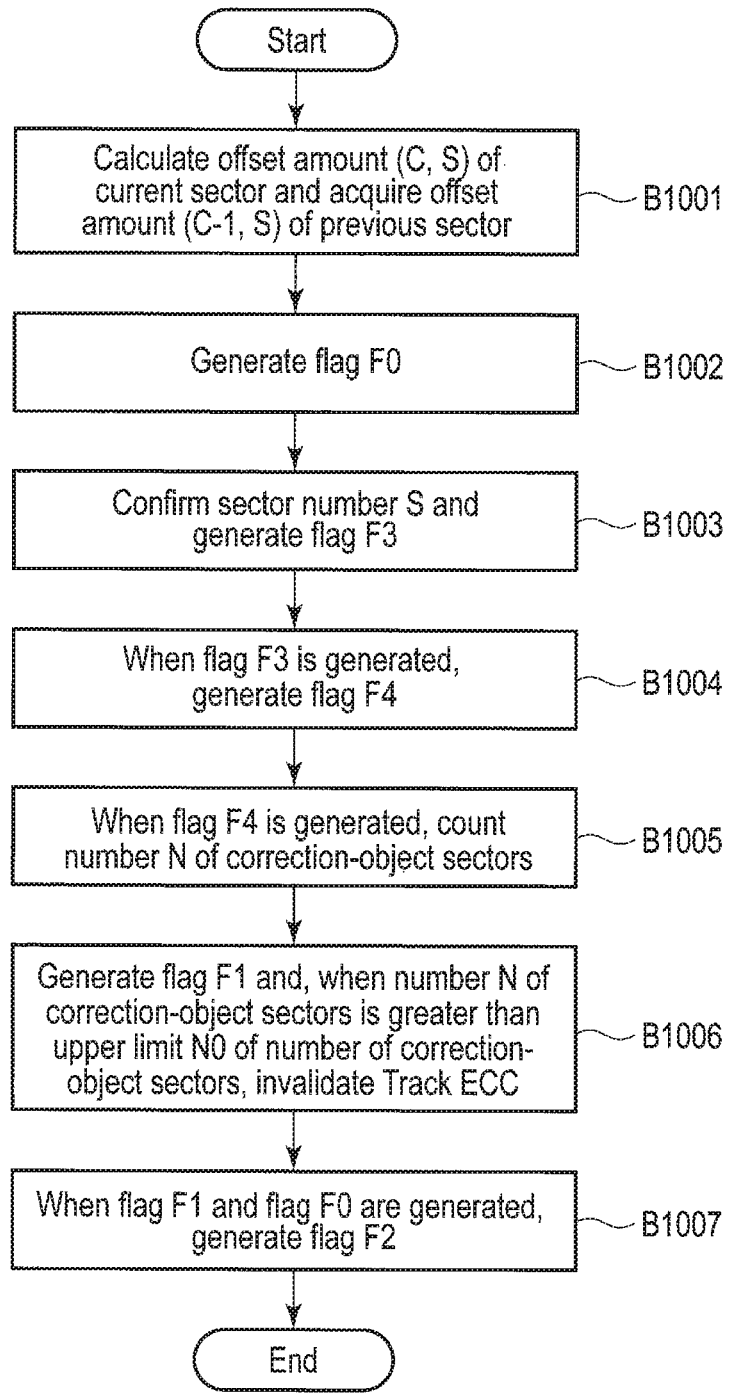
FIG. 10 is a flowchart showing an example of a write processing method according to the first embodiment.

FIG. 10 is a flowchart showing an example of a write processing method according to this embodiment.

The system controller 130 calculates the offset amount X1 (C, S) in the current sector, and acquires the offset amount X0 (C-1, S) in the previous sector from the memory A4 (B1001). When the offset amount X (C, S) in the current sector is greater than the DOL D1 (C, S) in the current sector (C, S) obtained by adding the offset amount X0 (C-1, S) in the previous sector to the reference DOL D0, the system controller 130 generates a flag F0 (B1002). The system controller 130 confirms the sector numbers S, and generates a flag F3 (B1003). Upon creation (or assertion) of the flag F3, the system controller 130 generates a flag F4 (B1004). Upon creation (or assertion) of the flag F4, the system controller 130 counts the number N of the correction-object sectors (B1005). In other words, upon creation of the flag F4, the system controller 130 increments the number N of the correction-object sectors by a particular numerical value, for example, one. When the number N of the correction-object sectors is greater than the upper limit NO of the number of the correction-object sectors, the system controller 130 generates a flag F1, and invalidates the write inhibit suppression function premised on the correction based on Track ECC (B1006). Upon creation (or assertion) of the flags F1 and F0, the system controller 130 generates a flag F2 (B1007), and then terminates the processing. In other words, when the flags F1 and F0 are input, the system controller 130 executes the retry processing.

Figure 11:
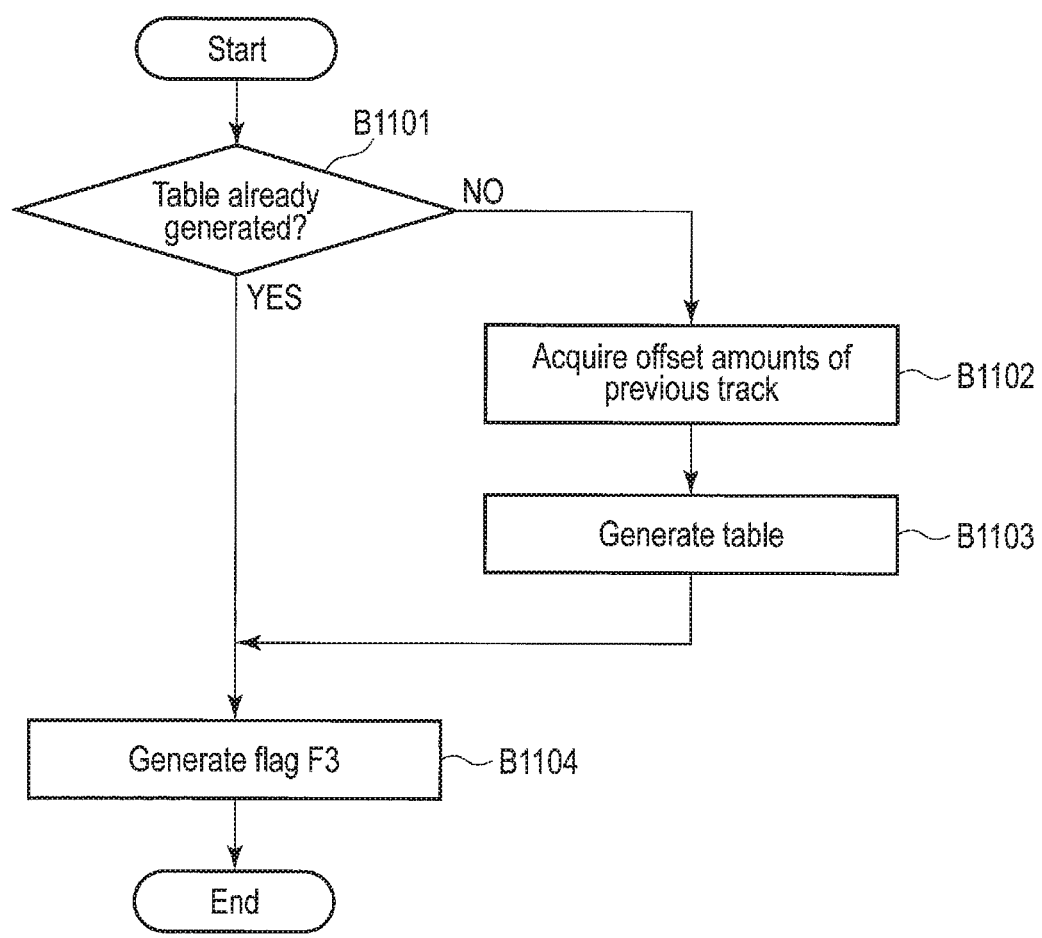
FIG. 11 is a flowchart showing an example of a method of generating a table according to the first embodiment.

FIG. 11 is a flowchart showing an example of a method of generating a table B1 according to this embodiment.

The system controller 130 determines whether or not the table B1 of the current track (cylinder) has been generated (B1101). Upon determination that the table B1 of the current track has not been generated (NO of B1101), the system controller 130 acquires the offset amounts in all the sectors included in the previous track (cylinder) already written from a particular recording area, for example, the memory A4 (B1102). The system controller 130 sets priority numbers to the sectors of the previous track in decreasing order of offset amount, rearranges the sector numbers of the previous track in decreasing order of offset amount, sets at least one of the sectors of the previous track in the order from the number of the least priority number to the number of to-be-corrected sectors as correction-object sectors, generates the table B1 (B1103), and then advances to the processing of B1104. For example, the system controller 130 may set priority numbers to the sectors of the previous track in increasing order of DOL in the sectors of the current track adjacent to the previous track in the forward direction, may rearrange the sector numbers of the previous track in increasing order of DOL in the sectors of the current track adjacent to the previous track in the forward direction, may set at least one of the sectors of the previous track in the order from the number of the least priority number to the number of to-be-corrected sectors as correction-object sectors, and may thereby generate the table B1. The system controller 130 compares the current sector numbers S and table B1 with each other and, when the previous sector (C-1, S) is a correction-object sector, generates a flag F3 (B1104), and then terminates the processing.

According to this embodiment, the magnetic disk device 1 sets the priority numbers to the sectors of the previous track on the basis of the offset amounts in the sectors of the previous track or on the basis of the DOLs in the sectors of the current track. The magnetic disk device 1 sets at least one of the sectors of the previous track in the order from the number of the least priority number to the number of to-be-corrected sectors as correction-object sectors on the basis of the DOLs in the sectors of the current track and maximum offset estimate in the current track. Upon determination that the offset amount in the current sector is greater than the DOL in the current sector and that the previous sector is a correction-object sector, the magnetic disk device 1 suppresses the retry processing (or interruption of the write processing) and continues the write processing. The magnetic disk device 1 makes the sector of the previous track adjacent to the sector of the current track having a small DOL in the direction opposite to the forward direction a priority object of error correction, and suppresses the retry processing in the sector of the current track having the small DOL, whereby the magnetic disk device 1 can reduce the occurrence frequency of the retry processing. Accordingly, the magnetic disk device 1 can improve the write performance.

Next, a magnetic disk device according to each of modification examples of the first embodiment will be described below. In the modification examples, parts identical to the first embodiment are denoted by reference symbols identical to the first embodiment and detailed descriptions of the parts are omitted.

Modification Example 1

A magnetic disk device 1 according to a modification example 1 differs from the magnetic disk device of the first embodiment described previously in that the priority number is changed when a seek of the current track is carried out.

The MPU 60 changes priority numbers of a particular number of sectors of a previous track including sectors of the previous track corresponding to sectors of a current track positioned by seeking the current track, and sets a correction-object sector on the basis of the changed priority numbers of the sectors of the previous track. For example, when seeking the current track to start write processing from a starting sector of the current track, the MPU 60 decreases the priority number of the sector of the previous track corresponding to the starting sector. In other words, when seeking the current track to start write processing from the starting sector of the current track, the MPU 60 increases the priority (correction-object priority) of the sector of the previous track corresponding to the starting sector. In one example, when seeking the current track to start write processing from the starting sector of the current track, the MPU 60 changes the priority numbers of several sectors of the previous track including the sector of the previous track corresponding to the starting sector on the basis of the maximum offset estimate of the current track, and changes the correction-object sector of the several sectors.

Figures 12A, 12B:
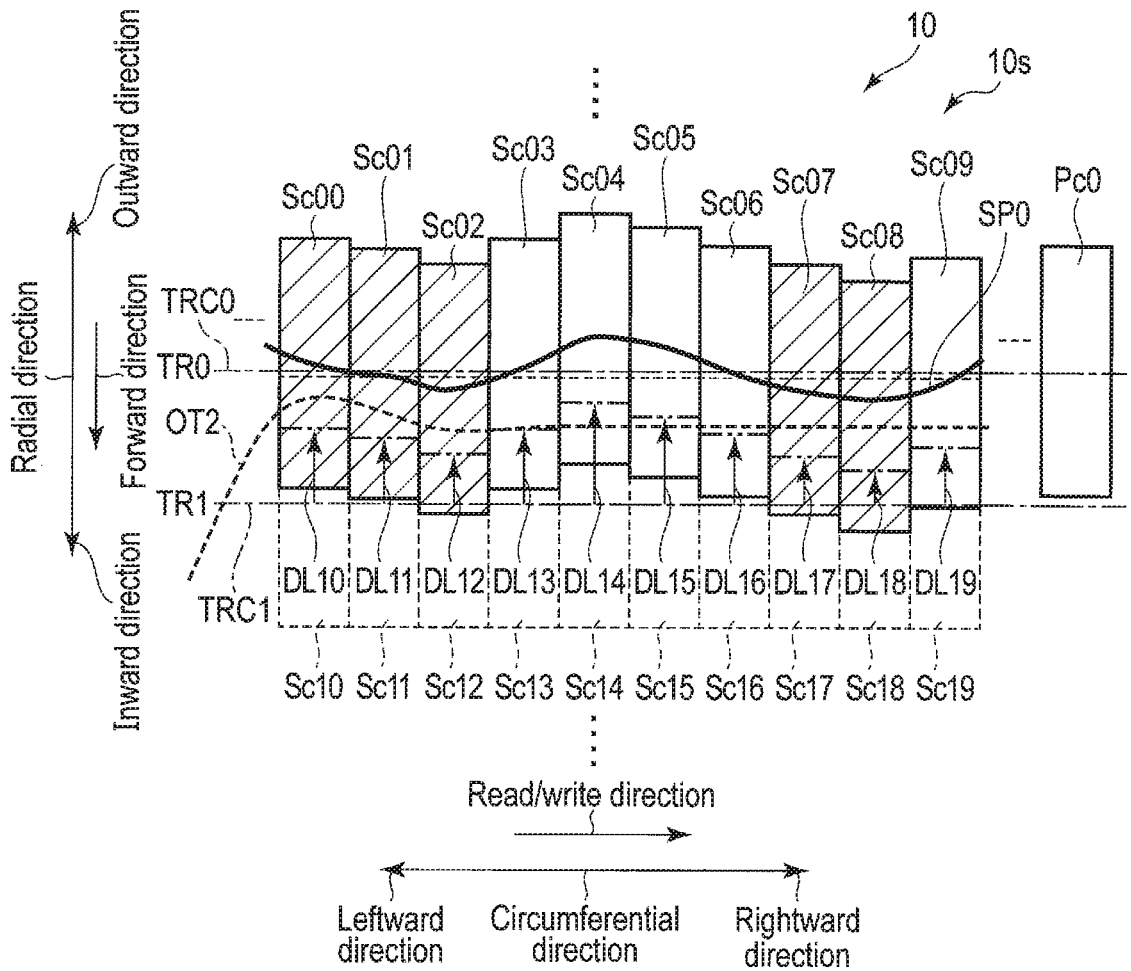
FIG. 12A is a schematic view showing an example of a method of setting a correction-object sector according to modification example 1.
FIG. 12B is a schematic view showing an example of a table of priority numbers set to sectors of a particular track according to the modification example 1.

FIG. 12A is a schematic view showing an example of a method of setting a correction-object sector according to the modification example 1.

FIG. 12B is a schematic view showing an example of a table TB2 of priority numbers set to sectors of a particular track according to the modification example 1. In FIG. 12A, a state where after the track TR0 is written, seeking of another track separate from the track TR0 in the radial direction is carried out according to a read request from, for example, the host, then a read operation is carried out and, thereafter seeking is carried out to start write processing of the track TR1 adjacent to the track TR0 in the forward direction. In FIG. 12A, write processing of the track TR1 is started by making the sought sector Sc10 the starting sector. In FIG. 12A, the maximum offset estimate OT2 of the track TR1 is shown. The maximum offset estimate OT2 becomes greater at the sector Sc10 and sector Sc11 in the direction opposite to the forward direction, i.e., toward the track TR0 side than the sectors Sc13 to Sc19. In FIG. 12B, a table TB2 including the sector numbers of the sectors of the previous track, priority numbers (hereinafter referred to as DDOL priority numbers in some cases) corresponding to the sector numbers of the sectors of the previous track of the case where the track TR1 is written by the DDOL function shown in FIG. 6B, and priority numbers (hereinafter referred to as SEEK priority numbers in some cases) corresponding to the sector numbers of the previous track of the case where the track TR1 is written by seeking the current track and by means of the DDOL function is shown. In the DDOL priority numbers and SEEK priority numbers, the priority (correction-object priority) is higher in ascending order of number.

In the example shown in FIG. 12A, after writing the track TR0, when the MPU 60 seeks another track separate from the track TR0 in the radial direction according to a read request from, for example, the host and, thereafter seeks the track TR1 to start write processing from the sector Sc10, a SEEK priority number generated on the basis of the maximum offset estimate OT2 is selected. Which of the DDOL priority number and SEEK priority number is to be selected is determined according to the seek distance to the tack TR1 at which the write processing is started. As shown in FIG. 12B, the MPU 60 selectively records any of the sectors Sc00 to Sc09, DDOL priority numbers respectively set to the sectors SC00 to SC09, and SEEK priority numbers respectively set to the sectors Sc00 to Sc09 in a particular recording area, for example, media cache area 10m, volatile memory 70, nonvolatile memory 80 or the like as the table TB2. The MPU 60 sets, as correction-object sectors, the sectors of the number of to-be-corrected sectors of, for example, five, i.e., the sectors Sc08, Sc07, Sc01, Sc00, and Sc02 derived in ascending order of SEEK priority number from the sectors Sc00, Sc01, Sc02, Sc03, Sc06, Sc07, Sc08, and Sc09 of the previous track respectively adjacent in the direction opposite to the forward direction to the sectors Sc10, Sc11, Sc12, Sc13, Sc16, Sc17, Sc18, and Sc19 respectively corresponding to the DOLs less than the maximum offset estimate OT2, i.e., DL10, DL11, DL12, DL13, DL16, DL17, DL18, and DL19. The MPU 60 sets, as correction-object associated sectors, the sectors Sc18, Sc17, Sc11, Sc10, and Sc12 respectively adjacent to the correction-object sectors Sc08, Sc07, Sc01, Sc00, and Sc02 in the forward direction.

When starting the write processing of the track TR1, even if the offset amount in the correction-object associated sector Sc18, Sc17, Sc11, Sc10 or Sc12 exceeds the DOL DL18, DL17, DL11, DL10 or DL12 in the correction-object associated sector Sc18, Sc17, Sc1l, Sc10 or Sc12, the MPU 60 continues the processing of writing data to the correction-object associated sector Sc18, Sc17, Sc11, Sc10 or Sc12.

When starting the write processing of the track TR1, if the offset amount in the non-object associated sector Sc13, Sc14, Sc15, Sc16 or Sc19 exceeds the DOL DL13, DL14, DL15, DL16 or DL19 in the non-object associated sector Sc13, Sc14, Sc15, Sc16 or Sc19, the MPU 60 executes the retry processing of interrupting the processing of writing data to the non-object associated sector Sc13, Sc14, Sc15, Sc16 or Sc19, waiting for the rotational drive, and resuming the write processing from the non-object associated sector Sc13, Sc14, Sc15, Sc16 or Sc19.

Figure 13:
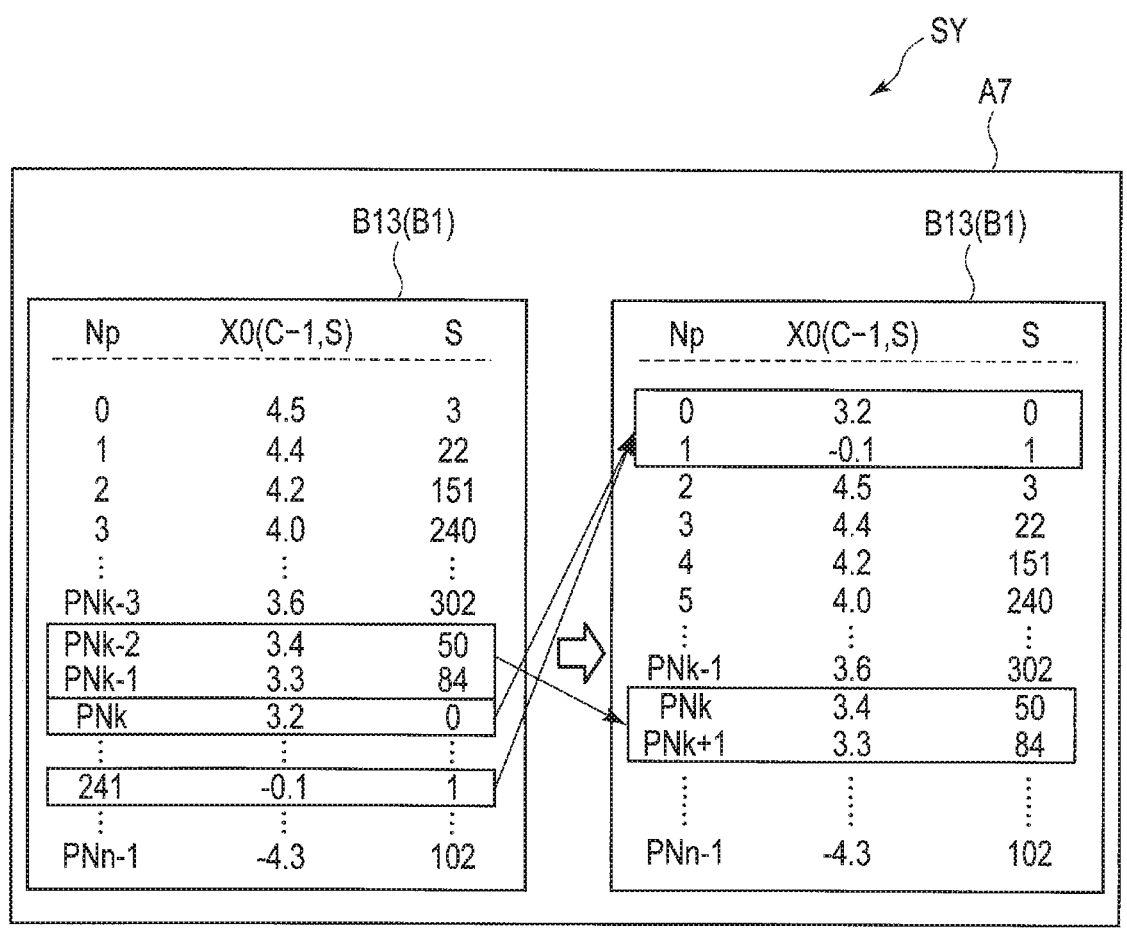
FIG. 13 is a schematic view showing an example of processing of a checker according to the modification example 1.

FIG. 13 is a schematic view showing an example of processing of the checker A7 shown in FIG. 7 according to the modification example 1. In FIG. 13, the table B1 includes a table B13. The table B13 includes sector numbers S (S=0, 1, 2, . . . , Ns−1), offset amounts X0 (C-1, S) in the previous sectors, and priority numbers Np (Np=0, 1, 2, . . . , PNn−1). In general, the number of sector numbers Ns and number of priority numbers PNn are equal to each other. In the table B13, the priority number PNk−2 is greater than the priority number PNk−3, priority number PNk−1 is greater than priority number PNk−2, and priority number 241 is greater than priority number PNk. Further, the priority number PNk+1 is greater than the priority number PNk. It should be noted that in FIG. 13, write processing is started from a sector of a small number on the track TR1.

The sector numbers S and set of the offset amounts X0 (C-1, [0, 1, 2, . . . , Ns−1]) of all the sectors (number of sectors Ns) in the previous track C-1 are input to the checker A7, and then the checker A7 generates the table B13. The checker A7 rearranges the sector numbers S in decreasing order of offset amount X0 (C-1, S) in the table B13. The checker A7 sets the priority numbers Np to the sector numbers S in decreasing order of offset amount X0 (C-1, S) in the table B13. When seeking to write the current track, the checker A7 decreases the priority number of the previous sector (C-1, S) having a smaller sector number S. In this case, the checker A7 moves down the priority order of the previous sector by a value by which the priority number of the previous sector is decreased to thereby increase the priority number.

According to the modification example 1, the magnetic disk device 1 changes the priority numbers of the sectors of a particular number including the sector of the previous track corresponding to the sector of the current track positioned by seeking the current track, and sets the correction-object sectors on the basis of the changed priority numbers of the sectors of the previous track. Accordingly, the magnetic disk device 1 can improve the write performance.

Modification Example 2

A magnetic disk device 1 according to a modification example 2 differs from the magnetic disk device 1 of each of the first embodiment and modification example 1 described previously in that the priority numbers are changed when the write processing of the current track is started.

The MPU 60 changes the priority number of at least one sector (hereinafter referred to as a not-yet-written adjacent sector in some cases) of the previous track adjacent, in the direction opposite to the forward direction, to at least one sector (hereinafter referred to as a not-yet-written sector in some cases) of the current track not written yet when the write processing of the current track is started. When writing the current track, the MPU 60 sets the not-yet-written adjacent sectors as correction-object sectors in the order from the least priority number to the number of to-be-corrected sectors on the basis of the DOLs of the not-yet-written sectors of the current track. When writing the current track, if the suppression processing of the write inhibit operation has not been executed, for the reason that the offset amount is small, in the current sector the previous sector of which has been determined to be an error-correction object, the MPU 60 moves up the correction-object priority of the sector previous to the write-unexecuted sector.

Figure 14A:
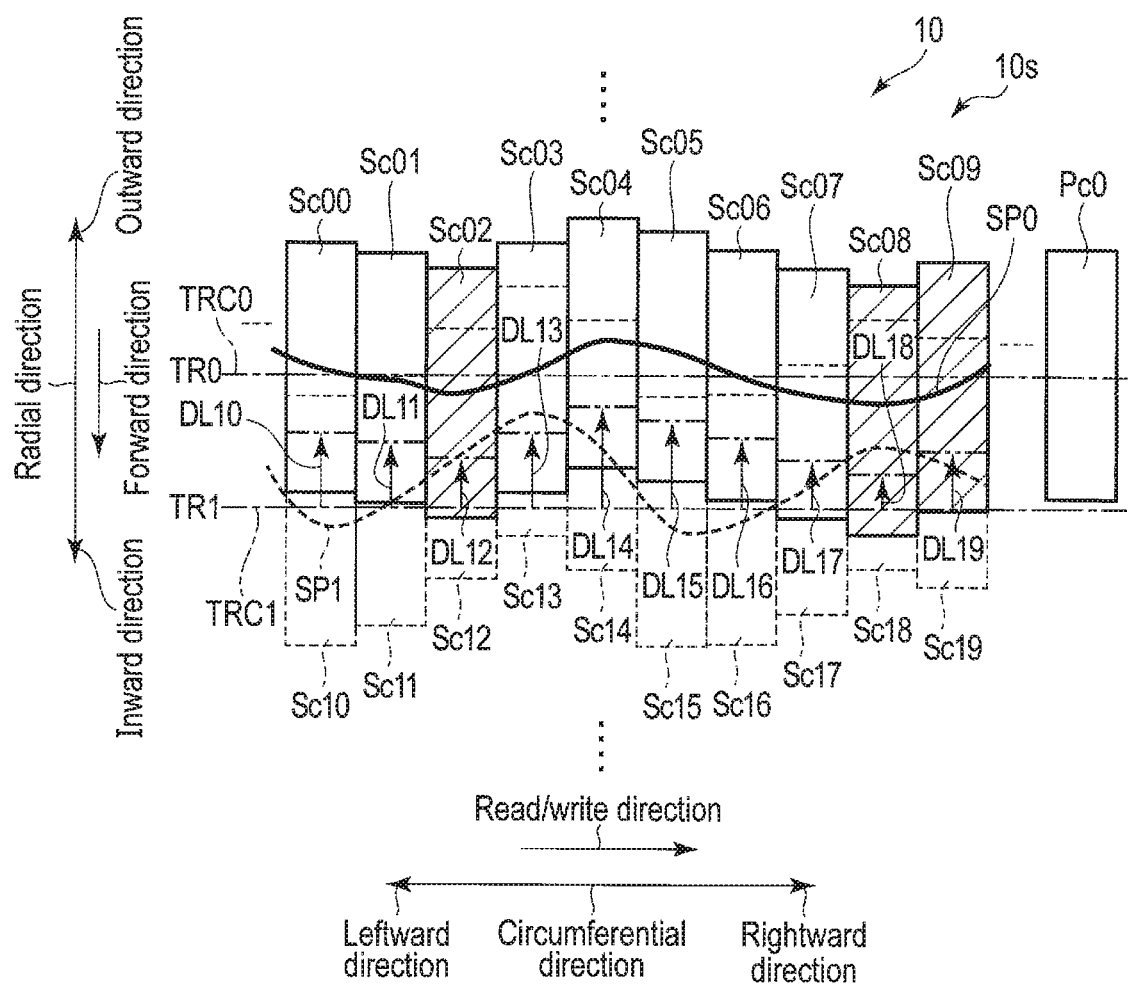
FIG. 14A is a schematic view showing an example of a method of setting a correction-object sector according to a modification example 2.

FIG. 14A is a schematic view showing an example of a method of setting a correction-object sector according to the modification example 2. FIG. 14B is a schematic view showing an example of a table TB3 of priority numbers set to sectors of a particular track according to the modification example 2. In FIG. 14A, a track TR0 and track TR1 are shown. In FIG. 14A, a state where the track TR0 has been written and, thereafter track TR1 adjacent to the track TR0 in the forward direction is written is shown. In FIG. 14A, the write processing of the track TR1 is executed by using the sector Sc10 as the starting sector. In FIG. 14A, the target route (track center) TRC1 at the time of writing the track TR1, and actual route SP1 at the time when the track TR1 is written are shown. The actual route SP extends in the circumferential direction, and varies in the radial direction with respect to the target route TRC1. The actual route SP1 corresponds to a route passing through the central parts of the sectors Sc10 to Sc19. In FIG. 14B, a table TB3 including the sector numbers of the sectors of the previous track, and priority numbers corresponding to the sector numbers of the sectors of the previous track is shown. In FIG. 14B, in the vertical direction of the priority numbers of the table TB3, the sector numbers of the written sectors of the current tack are shown. In the table TB3 of FIG. 14B, the double circle (⊚) indicates a particular sector of the previous track corresponding to a particular sector of the current track to which data is normally written because the offset is less than the DOL, circle (○) indicates a particular sector of the previous track corresponding to a particular track of the current track in which write inhibit is suppressed because of being a correction-object associated sector in spite of having an offset thereof exceeding a DOL thereof, and cross (X) indicates a particular sector of the previous track corresponding to a particular sector of the current track in which write is inhibited and on which retry processing is executed because of having an offset thereof exceeding a DOL thereof and not being a correction-object associated sector. In FIG. 14B, a previous sector of a sector the priority number of which is less than or equal to four (4) is a correction-object sector. That is, in FIG. 14B, the sectors Sc08, Sc07, Sc02, Sc09, and Sc01 are correction-object sectors.

In the example shown in FIG. 14A, when writing, after writing the track TR0, the track TR1 separate from the track TR0 in the forward direction, the MPU 60 changes the priority number of a not-yet-written adjacent sector in the sectors Sc00 to Sc09 on the basis of the DOL of the not-yet-written sector in the sectors of the track TR1, for example, the sectors Sc10 to Sc19.

The MPU 60 writes data to the sector Sc10 according to the actual route SP1. The sector Sc10 has the priority number 6, and hence is not a correction-object associated sector. The actual route SP1 is positioned in the forward direction from the DOL DL10 in the sector Sc10, and hence the MPU 60 normally writes data to the sector Sc10. In the table TB3 of FIG. 14B, the MPU 60 puts a double circle ((⊚)) to the sector Sc00. The sector Sc00 of the priority number 6 has normally been written, and hence the sectors of the priority number greater than or equal to the priority number 7, i.e., the priority number 7 of the sector SC03 is changed to the priority number 6, priority number 8 of the sector Sc05 is changed to the priority number 7, and priority number 9 of the sector Sc04 is changed to the priority number 8.

The MPU 60 writes data to the sector Sc11 next to the sector Sc10 according to the actual route SP1. The sector Sc10 has the priority number 4, and hence is a correction-object associated sector. The actual route SP1 is positioned in the forward direction from the DOL DL11 in the sector Sc11, and hence the MPU 60 normally writes data to the sector Sc11. In the table TB3 of FIG. 14B, the MPU 60 puts a double circle (⊚) to the sector Sc01. The sector Sc11 of the priority number 4 has normally been written, and hence the sector of a priority number greater than or equal to the priority number 5, i.e., the priority number 5 of the sector Sc06 is changed to the priority number 4, priority number 6 of the sector Sc03 is changed to the priority number 5, priority number 7 of the sector Sc05 is changed to the priority number 6, and priority number 8 of the sector Sc04 is changed to the priority number 7. At this time, the number N of the correction-object sectors is not incremented, and hence the previous sector of the sector Sc06 the priority number of which has been changed to the priority number 4 newly becomes the correction-object associated sector.

The MPU 60 writes data to the sector Sc12 next to the sector Sc11 according to the actual route SP1. The sector Sc12 has the priority number 2, and hence the previous sector thereof is an error-correction object. In the sector Sc12, although the actual route SP1 is positioned in the direction opposite to the forward direction from the DOL DL12, the sector Sc12 has the priority number 2, and hence the write inhibit suppression processing is executed, retry operation is not carried out, and thus the MPU 60 normally writes data to the sector Sc12. In the table TB3 of FIG. 14B, the MPU 60 puts a circle (○) to the sector Sc02. The sector Sc11 of the priority number 2 has normally been written, and hence the MPU 60 changes the priority number of the sector of the priority number greater than or equal to the priority number 3, i.e., the priority number 3 of the sector Sc09 to the priority number 2, changes priority number 4 of sector Sc06 to priority number 3, changes priority number 5 of sector Sc03 to priority number 4, changes priority number 6 of sector Sc05 to priority number 5, and changes priority number 7 of sector Sc04 to priority number 6. The processing of writing data to the correction-object associated sector Sc12 corresponding to the correction-object sector Sc02 has normally been completed, and hence the MPU 60 sets the sector Sc03 of a priority number smaller next to the sector Sc06 as a correction-object sector. At this time, the number N of the correction-object sectors has been increased to 1 and hence the number of the remaining correction-object associated sectors becomes 4, and the sectors of the priority order numbers 0 to 3 become the correction-object associated sectors. Although the sector Sc06 which has become the sector of the priority order number 3 newly becomes a correction-object associated sector, the sector Sc03 which has become the sector of the priority order number 4 does not newly become a correction-object associated sector.

The MPU 60 writes data to the sector Sc13 next to the sector Sc12 according to the actual route SP1. In the sector Sc13, the actual route SP1 is positioned on the opposite side of the DOL DL13 in the direction opposite to the forward direction from the DOL DL13, and hence the MPU 60 writes the sector Sc13 on the opposite side of the DOL DL13 in the direction opposite to the forward direction from the DOL DL13. The sector Sc03 is a sector of the priority number 4, and thus the sector Sc13 does not become a correction-object associated sector, and hence the MPU 60 stops the operation of writing data to the sector Sc13 and executes the retry processing. In the table TB3 of FIG. 14B, the MPU 60 puts a cross (X) to the sector Sc03, thus the write processing of the sector Sc03 of the priority number 4 has been completed, and hence the MPU 60 changes the priority number 5 of the sector Sc05 to the priority number 4, changes the priority number 6 of the sector Sc04 to the priority number 5, decrements the number of to-be-corrected sectors by 1, and maintains the correction-object sectors Sc08, Sc07, Sc09, and Sc06.

The MPU 60 writes data to the sector Sc14 next to the sector Sc13 according to the actual route SP1. The actual route SP1 is positioned in the forward direction from the DOL DL 14 in the sector Sc14, and hence the MPU 60 normally writes data to the sector Sc14. In the table TB3 of FIG. 14B, the MPU 60 puts a double circle (⊚) to the sector Sc04. The MPU 60 maintains the correction-object sectors Sc08, Sc07, Sc09, and Sc06.

The MPU 60 writes data to the sector Sc15 next to the sector Sc14 according to the actual route SP1. The actual route SP1 is positioned in the forward direction from the DOL DL15 in the sector Sc15, and hence the MPU 60 normally writes data to the sector Sc15. In the table TB3 of FIG. 14B, the MPU 60 puts a double circle (⊚) to the sector Sc05. The MPU 60 maintains the correction-object sectors Sc08, Sc07, Sc09, and Sc06.

The MPU 60 writes data to the sector Sc16 next to the sector Sc15 according to the actual route SP1. The actual route SP1 is positioned in the forward direction from the DOL DL16 in the sector Sc16, and hence the MPU 60 normally writes data to the sector Sc16. In the table TB3 of FIG. 14B, the MPU 60 puts a double circle (⊚) to the sector Sc06. The MPU 60 maintains the correction-object sectors Sc08, Sc07, and Sc09.

The MPU 60 writes data to the sector Sc17 next to the sector Sc16 according to the actual route SP1. The actual route SP1 is positioned in the forward direction from the DOL DL17 in the sector Sc17, and hence the MPU 60 normally writes data to the sector Sc17. In the table TB3 of FIG. 14B, the MPU 60 puts a double circle (⊚) to the sector Sc07. The MPU 60 maintains the correction-object sectors Sc08, and Sc09.

The MPU 60 writes data to the sector Sc18 next to the sector Sc17 according to the actual route SP1. Although the actual route SP1 is positioned on the opposite side of the DOL DL18 in the direction opposite to the forward direction from the DOL DL18, the sector Sc08 is a correction-object sector, and hence the MPU 60 executes the write processing and normally writes data to the sector Sc18. In the table TB3 of FIG. 14B, the MPU 60 puts a circle (○) to the sector Sc08. The MPU 60 decrements the number of to-be-corrected sectors by 1, and maintains the correction-object sector Sc09.

The MPU 60 writes data to the sector Sc19 next to the sector Sc18 according to the actual route SP1. The actual route SP is positioned in the forward direction from the DOL DL19 in the sector Sc19, and hence the MPU 60 normally writes data to the sector Sc19. In the table TB3 of FIG. 14B, the MPU 60 puts a circle (○) to the sector Sc09, and decrements the number of to-be-corrected sectors by 1.

According to the modification example 2, in the magnetic disk device 1, when writing the current track, the MPU 60 changes the priority number of at least one not-yet-written adjacent sector. When writing the current track, the MPU 60 sets the not-yet-written adjacent sectors ranging in the order from the least priority number to the number of to-be-corrected sectors as correction-object sectors on the basis of the DOLs of the not-yet-written sectors of the current track. When writing the current track, if the MPU 60 executes write inhibit suppression premised on the error correction of the previous sector, the MPU 60 decrements the number of to-be-corrected sectors according to the number of times the write inhibit suppression has been executed. When the write inhibit suppression is not executed on the correction-object associated sector, a smaller priority number is assigned to the not-yet-written sector, and hence the probability of the retry processing being executed at time of write to the sector which has been lower in priority order in the initial state and has not become a correction-object associated sector decreases. Accordingly, the magnetic disk device 1 can improve the write performance.

Modification Example 3

A magnetic disk device 1 according to a modification example 3 differs from the magnetic disk device 1 of each of the first embodiment, modification example 1, and modification example 2 described previously in that Adaptive Track Center (ATC) control or Automatic Track width Control (ATC) is executed therein.

A MPU 60 generates a route (hereinafter referred to as an adjusted route in some cases) of the current track on the basis of an actual route corresponding to the previous track, and executes control (hereinafter referred to as Adaptive Track Center (ATC) control or Automatic Track width Control (ATC) in some cases) of a head 15 (for example, write head 15W) on the basis of the adjusted route of the current track.

The MPU 60 decreases the priority number of at least one sector of the previous track corresponding to at least one sector of the current track the maximum offset estimate of which includes a high-frequency component. For example, the MPU 60 increases the correction-object priority of at least one sector of the previous track corresponding to at least one sector of the current track the maximum offset estimate of which includes a high-frequency component. In one example, when a value of a difference between the maximum offset estimates of two sectors adjacent to each other in the circumferential direction of the current track is great, the MPU 60 decreases the priority numbers of two sectors of the previous track respectively corresponding to these two sectors of the current track. Further, in one example, when a value of a difference between the target positions of two sectors adjacent to each other in the circumferential direction of the current track is great, the MPU 60 decreases the priority numbers of two sectors of the previous track respectively corresponding to these two sectors of the current track.

Figure 15:
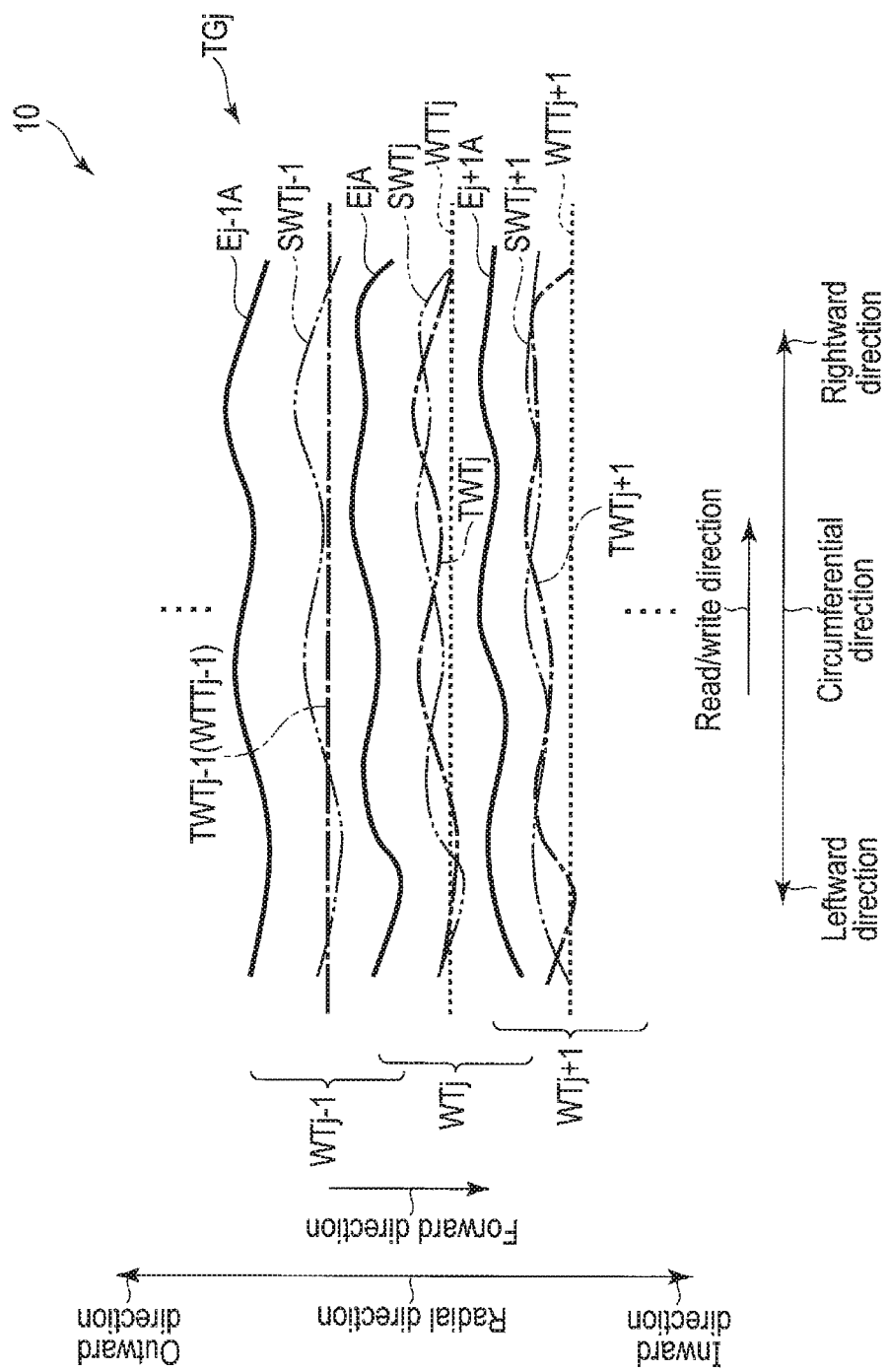
FIG. 15 is a schematic view showing an example of ATC.

FIG. 15 is a schematic view showing an example of ATC. In the example shown in FIG. 15, the band area TGj includes write tracks WTj−1, WTj, and WTj+1. In the band area TGj, the write tracks WTj−1 to WTj+1 are each overwritten with unilaterally adjacent tracks in this order in the forward direction. The write track WTj−1 includes a track edge Ej−1A. In the example shown in FIG. 15, the track edge Ej−1A is an end of the write track WTj−1 in the outward direction. In FIG. 15, a target route WTTj−1 corresponding to the write track WTj−1 is shown. The write track WTj includes a track edge EjA. In the example, shown in FIG. 15, the track edge EjA is an end of the write track WTj in the outward direction. In FIG. 15, a target route WTTj corresponding to the write track WTj is shown. The write track WTj+1 includes a track edge Ej+1A. In the example shown in FIG. 15, the track edge Ej+1A is an end of the write track WTj+1 in the outward direction. In FIG. 15, a target route WTTj+1 corresponding to the write track WTj+1 is shown.

The MPU 60 carries out positioning control of the write head 15W in such a manner that the write head 15W follows the initial route TWTj−1 at the time when the write track WTj−1 is written. The initial route TWTj−1 corresponds to the target route WTTj−1. Actually, when writing the write track WTj−1, the write head 15W travels along the actual route SWTj−1 including a write error. The MPU 60 acquires write route information about the head 15, for example, write head 15W at the time of write processing corresponding to the actual route SWTj−1, and records the acquired write route information in a particular recording area, for example, the disk 10, volatile memory 70, nonvolatile memory 80, buffer memory 90 or the like.

The MPU 60 generates the adjusted route TWTj at the time of writing the write track WTj on the basis of the write route information corresponding to the actual route SWTj−1, and carries out positioning control of the write head 15W in such a manner that the write head 15W follows the adjusted route TWTj. Actually, when writing the write track WTj, the write head 15W travels along the actual route SWTj. The MPU 60 acquires write route information corresponding to the actual route SWTj, and records the acquired write route information in a particular recording area, for example, the disk 10, volatile memory 70, nonvolatile memory 80, buffer memory 90 or the like.

The MPU 60 generates the adjusted route TWTj+1 at the time of writing the write track WTj+1 on the basis of the write route information corresponding to the actual route SWTj, and carries out positioning control of the write head 15W in such a manner that the write head 15W follows the adjusted route TWTj+1. Actually, when writing the write track WTj+1, the write head 15W travels along the actual route SWTj+1. The MPU 60 acquires write route information corresponding to the actual route SWTj+1, and records the acquired write route information in a particular recording area, for example, the disk 10, volatile memory 70, nonvolatile memory 80, buffer memory 90 or the like.

FIG. 16A is a schematic view showing an example of a method of setting a correction-object sector according to the modification example 3. FIG. 16B is a schematic view showing an example of a table TB4 of priority numbers set to several sectors of a particular track according to the modification example 3. In FIG. 16A, a track TR0 and track TR1 are shown. In FIG. 16A, a state where the track TR0 has been written and, thereafter write processing of track TR1 adjacent to the track TR0 in the forward direction is to be started is shown. In FIG. 16A, the actual route SP2 at the time when the track TR0 has been written is shown. The actual route SP2 extends in the circumferential direction and varies in the radial direction with respect to the target route TRC0. In FIG. 16A, the target route (track center) TRC1 of the track TR1, and adjusted route ATRC1 adjusted by the ATC control are shown. The adjusted route ATRC1 extends in the circumferential direction, and varies in the radial direction with respect to the target route TRC1. In FIG. 16A, the track TR1 is written according to the adjusted route ATRC1. In FIG. 16A, the maximum offset estimate OT3 in the track TR1 is shown. The maximum offset estimate OT3 extends in the circumferential direction while varying in the radial direction according to the adjusted route ATRC1. The maximum offset estimate OT3 largely varies in the radial direction in the sectors Sc14 to Sc17. Largely changing of the maximum offset estimate OT3 in the radial direction within a range of a small number of sectors is called a high-frequency component in some cases. In FIG. 16B, a table TB4 including sector numbers of several sectors of a previous track and priority numbers corresponding to the sector numbers of the several sectors of the previous track is shown.

In the example shown in FIG. 16A, when (or before) writing the track TR1 adjacent to the track TR0 in the forward direction from the track TR0 after writing the track TR0, the MPU 60 sets smaller priority numbers to the sectors Sc04 to Sc07 respectively adjacent, in the direction opposite to the forward direction, to the sectors of the track TR1 including a high-frequency component, for example, the sectors Sc14 to Sc17. The MPU 60 sets the priority number 0 to the sector Sc05, sets priority number 1 to sector Sc07, sets priority number 2 to sector Sc04, and sets priority number 3 to sector Sc06. As shown in FIG. 16B, the MPU 60 records the sectors Sc04 to Sc07, and priority numbers respectively set to the sectors Sc04 to Sc07 in correlation with each other as the table TB4 in a particular recording area, for example, the media cache area 10m, volatile memory 70, nonvolatile memory 80 or the like. The MPU 60 sets the sectors Sc04 to Sc07 of the previous track respectively adjacent to the sectors Sc14 to Sc17 in the direction opposite to the forward direction as correction-object sectors in ascending order of priority number from the number of the least priority number to the number of to-be-corrected sectors, for example, 5. The MPU 60 sets the sectors Sc14 to Sc17 respectively adjacent to the correction-object sectors Sc04 to Sc07 in the forward direction as correction-object associated sectors.

Figure 17:
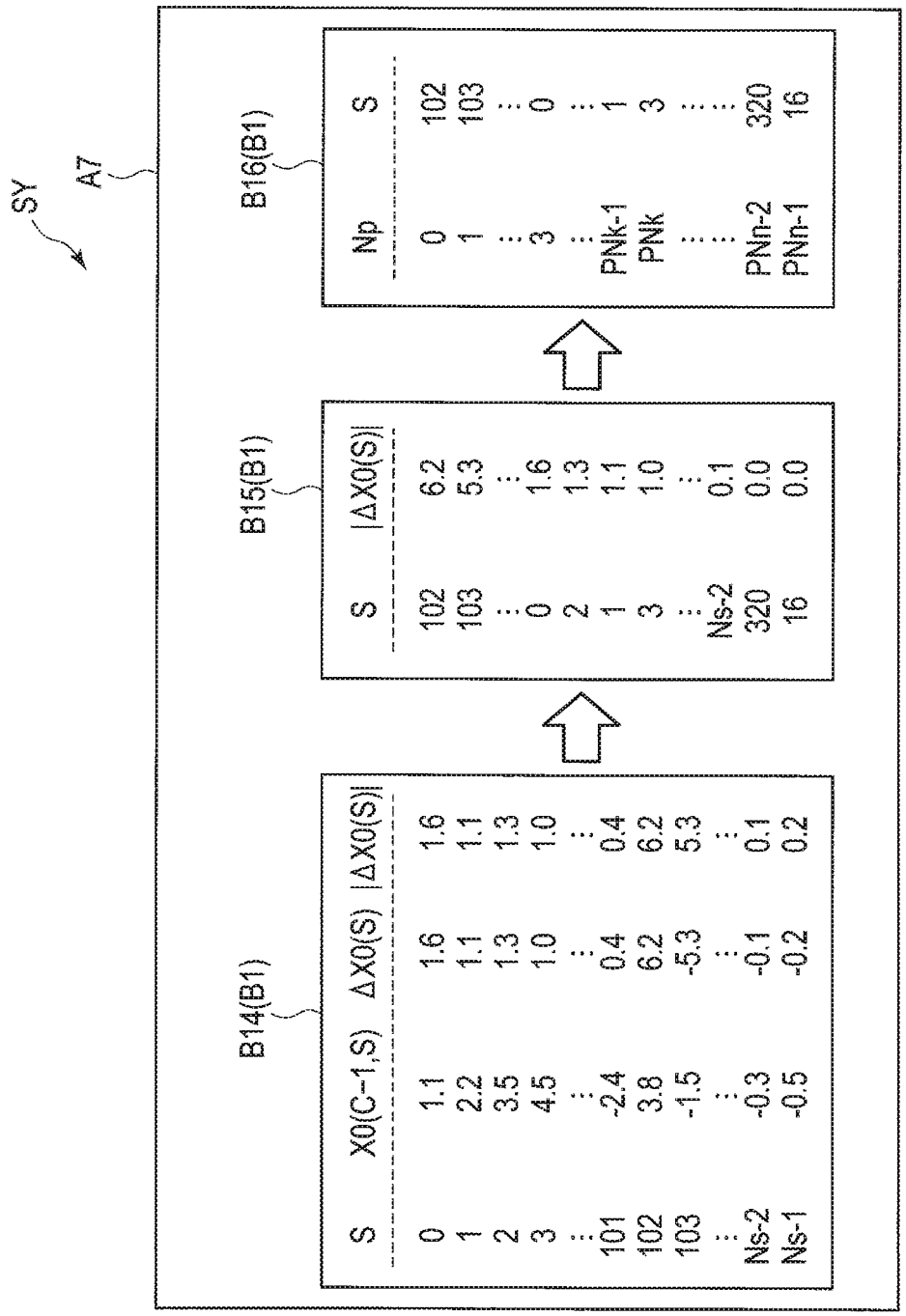
FIG. 17 is a schematic view showing an example of processing of the checker shown in FIG. 7 according to the modification example 3.

FIG. 17 is a schematic view showing an example of processing of the checker A7 shown in FIG. 7 according to the modification example 3. In FIG. 17, a table B1 includes a table B14, table B15, and table B16. The table B14 includes sector numbers S (S=0, 1, 2, . . . , Ns−1) of all the sectors (number of sectors Ns) included in the previous track C-1, offset amounts X0 (C-1, S) in the previous sectors corresponding to all the sectors, values of differences ΔX0 (S) between the offset amounts X0 (C-1, S) and offset amounts X0 (C-1, S-1) in the sectors (C-1, S-1) adjacent to the previous sectors (C-1, S) on the left side in the circumferential direction, and absolute values |ΔX0 (S)| of the values of differences ΔX0 (S). In the table B14, the sector number Ns−2 is less than the sector number Ns−1, and is greater than the sector number 103. The table B15 includes sector numbers S, and absolute values |ΔX0 (S)| of the values of differences ΔX0 (S). The table 16 includes priority numbers Np (Np=0, 1, 2, . . . , PNn−1) and sector numbers S. In general, the number PNn of pieces of the priority numbers is equal to the number Ns of all the sectors. In the table B15, the priority number PNn−2 is less than priority number PNn−1, and is greater than priority number PNk.

To the checker A7, the sector numbers S and set of the offset amounts X0 (C-1, [0, 1, 2, . . . , Ns−1]) of all the sectors (C-1, [0, 1, 2, . . . , Ns−1]) are input, and the checker A7 generates the table B14. In the table B14, the checker A7 rearranges the sector numbers S in decreasing order of absolute value |ΔX0(S)| of the value of a difference ΔX0 (S) to thereby generate the table B15. In the table B15, the checker A7 sets the priority numbers Np to the sector numbers S in decreasing order of absolute value |ΔX0 (S)| of the value of a difference ΔX0 (S). The checker A7 sets sectors of the previous track of the sector numbers corresponding to the priority numbers ranging in increasing order of priority number Np from the least priority number Np to the number of to-be-corrected sectors as correction-object sectors.

According to the modification example 3, the magnetic disk device 1 executes the ATC control. Further, the magnetic disk device 1 decreases the priority number of at least one sector of the previous track corresponding to at least one sector of the current track the maximum offset estimate of which includes a high-frequency component. Accordingly, it is possible to restrain a retry operation of executing write inhibit, waiting for the rotational drive, and executing the write processing again from being executed on a sector which cannot follow a high-frequency route of the previous track generated by the ATC control because of the frequency follow-up limit of the head positioning mechanism and the DOL of which is exceeded by preferentially making the previous sector a correction-object sector. Accordingly, the magnetic disk device 1 can improve the write performance.

In each of the aforementioned first embodiment, modification example 1, modification example 2, and modification example 3, although the example in which the configuration of each of the first embodiment, modification example 1, modification example 2, and modification example 3 is applied to the magnetic disk device of the shingled magnetic recording scheme has been shown, it is also possible to apply the configuration of each of the first embodiment, modification example 1, modification example 2, and modification example 3 to the magnetic disk device of the conventional magnetic recording scheme.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
 a disk comprising a first track including a first sector positioned in a first direction of the radial direction with a first positioning error, a second sector positioned in the first direction with a second positioning error less than the first positioning error, and a first parity sector;
 a head configured to write data to the disk and read data from the disk; and
 a controller configured to, when writing a second track adjacent to the first track in the first direction, even if, in a third sector of the second track adjacent to the first sector in the first direction, a first upper limit of an error in positioning in a second direction opposite to the first direction to be determined according to the first positioning error of the first sector is exceeded, continue the processing of writing data to the third sector, and if, in a fourth sector of the second track adjacent to the second sector in the first direction, a second upper limit of an error in positioning in the second direction to be determined according to the second positioning error of the second sector is exceeded, stop the processing of writing data to the fourth sector.

2. The magnetic disk device of claim 1, wherein when a read error occurs in the first sector, the controller executes an error correction on the first sector on the basis of the first parity sector.

3. The magnetic disk device of claim 2, wherein
the controller sets numbers in decreasing order of priority according to a degree of the possibility of an error correction at the time of read to be determined by a positioning error at the time of write to each sector of the first track being executed and, at the time of an operation of write to each sector of the second track, controls write stop processing of a case where an upper limit of a positioning error in each sector is exceeded on the basis of the numbers.

4. The magnetic disk device of claim 3, wherein
the priority of the first sector is higher than the priority of the second sector.

5. The magnetic disk device of claim 3, wherein
the controller possesses a table including the numbers of the sectors of the first track.

6. The magnetic disk device of claim 3, wherein
when the second upper limit is exceeded in the fourth sector, the controller executes retry processing of stopping the processing of writing to the fourth sector and then resuming writing to the fourth sector.

7. The magnetic disk device of claim 6, wherein
the controller executes the retry processing on at least one sector of the second track adjacent to at least one sector of the first track other than error-correctable sectors of the first track of the number of pieces of a first value determined in decreasing order of priority.

8. The magnetic disk device of claim 4, wherein
when seeking the second track to thereby carry out write to the third sector, the controller increases the priority of the first sector.

9. The magnetic disk of claim 4, wherein
when writing the third sector, if the first upper limit is not exceeded, the controller increases the priority of the second sector.

10. The magnetic disk device of claim 4, wherein
when writing the second track on the basis of a first route according to which the first track has been written, if a value of a difference between a first positioning position which is a target positioning position in the radial direction of the third sector and a second positioning position which is a target positioning position in the radial direction of a sixth sector of the second track adjacent to the third sector in the circumferential direction is great, the controller increases the priority of the first sector and the priority of a fifth sector of the first track adjacent to the sixth sector in the second direction.

11. A write processing method to be applied to a magnetic disk device including a disk comprising a first track including a first sector positioned in a first direction in the radial direction with a first positioning error, a second sector positioned in the first direction with a second positioning error less than the first positioning error, and a first parity sector, and a controller comprising:
continuing, when writing a second track adjacent to the first track in the first direction, even if, in a third sector of the second track adjacent to the first sector in the first direction, a first upper limit of an error in positioning in a second direction opposite to the first direction to be determined according to the first positioning error of the first sector is exceeded, the processing of writing data to the third sector; and
stopping if, in a fourth sector of the second track adjacent to the second sector in the first direction, a second upper limit of an error in positioning in the second direction to be determined according to the second positioning error of the second sector is exceeded, the processing of writing data to the fourth sector.

12. The write processing method of claim 11, further comprising executing, when a read error occurs in the first sector, an error correction on the first sector on the basis of the first parity sector.

13. The write processing method of claim 12, further comprising:
setting numbers in decreasing order of priority according to a degree of the possibility of the error correction at the time of read to be determined by a positioning error at the time of write to each sector of the first track being executed; and
controlling, at the time of an operation of write to each sector of the second track, write stop processing of a case where an upper limit of a positioning error in each sector is exceeded on the basis of the numbers.

14. The write processing method of claim 13, wherein
the priority of the first sector is higher than the priority of the second sector.

15. The write processing method of claim 13, wherein
the controller comprises a table including the numbers of the sectors of the first track.

16. The write processing method of claim 13, further comprising executing, when the second upper limit is exceeded in the fourth sector, retry processing of stopping the processing of writing to the fourth sector and then resuming writing to the fourth sector.

17. The write processing method of claim 16, further comprising executing the retry processing on at least one sector of the second track adjacent to at least one sector of the first track other than error-correctable sectors of the first track of the number of pieces of a first value determined in decreasing order of priority.

18. The write processing method of claim 14, further comprising increasing, when seeking the second track to thereby carry out write to the third sector, the priority of the first sector.

19. The write processing method of claim 14, further comprising increasing, when writing the third sector, if the first upper limit is not exceeded, the priority of the second sector.

20. The write processing method of claim 14, further comprising increasing, when writing the second track on the basis of a first route according which the first track has been written, if a value of a difference between a first positioning position which is a target positioning position in the radial direction of the third sector and a second positioning position which is a target positioning position in the radial direction of a sixth sector of the second track adjacent to the third sector in the circumferential direction is great, the priority of the first sector and the priority of a fifth sector of the first track adjacent to the sixth sector in the second direction.

* * * * *